United States Patent
Koshihara et al.

(10) Patent No.: US 12,266,094 B2
(45) Date of Patent: Apr. 1, 2025

(54) LEARNED MODEL GENERATION METHOD, LEARNED MODEL, SURFACE DEFECT INSPECTION METHOD, STEEL MANUFACTURING METHOD, PASS/FAIL DETERMINATION METHOD, GRADE DETERMINATION METHOD, SURFACE DEFECT DETERMINATION PROGRAM, PASS/FAIL DETERMINATION PROGRAM, DETERMINATION SYSTEM, AND STEEL MANUFACTURING EQUIPMENT

(71) Applicant: JFE STEEL CORPORATION, Tokyo (JP)

(72) Inventors: Takahiro Koshihara, Tokyo (JP); Hiroaki Ono, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 775 days.

(21) Appl. No.: 17/413,759

(22) PCT Filed: Oct. 31, 2019

(86) PCT No.: PCT/JP2019/042848
§ 371 (c)(1),
(2) Date: Jun. 14, 2021

(87) PCT Pub. No.: WO2020/137151
PCT Pub. Date: Jul. 2, 2020

(65) Prior Publication Data
US 2022/0044383 A1 Feb. 10, 2022

(30) Foreign Application Priority Data

Dec. 25, 2018 (JP) .................................. 2018-241213

(51) Int. Cl.
*G06T 7/00* (2017.01)
*G01N 21/892* (2006.01)
*G06N 20/00* (2019.01)

(52) U.S. Cl.
CPC ............. *G06T 7/001* (2013.01); *G01N 21/892* (2013.01); *G06N 20/00* (2019.01)

(58) Field of Classification Search
CPC .......... G06T 7/001; G06T 2207/20081; G06T 2207/20084; G06T 2207/30108;
(Continued)

(56) References Cited

U.S. PATENT DOCUMENTS 6,625,515 B2 * 9/2003 Kerr .................... G01N 29/043
700/148
6,950,546 B2   9/2005 Chang et al.
(Continued)

FOREIGN PATENT DOCUMENTS

CN   107735674 A   2/2018
CN   108021938 A   5/2018
(Continued)

OTHER PUBLICATIONS

F. G. Bulnes, R. Usamentiaga, D. F. Garcia, J. Molleda and J. L. Rendueles, "Periodic defects in steel strips: Detection through a vision-based technique," in IEEE Industry Applications Magazine, vol. 19, No. 2, pp. 39-46, Mar.-Apr. 2013 (Year: 2013).*
(Continued)

*Primary Examiner* — Ross Varndell
(74) *Attorney, Agent, or Firm* — Oliff PLC

(57) ABSTRACT

A learned model generation method includes: using a teacher image including a defect map that is an image indicating a distribution of a defect portion of a surface of steel and having an equal image size, and presence/absence of periodic defects assigned in advance to the defect map;
(Continued)

and generating a learned model by machine learning, the learned model for which: an input value is a defect map that is an image indicating a distribution of a defect portion of a surface of steel and having an image size of the equal image size; and an output value is a value concerning presence/absence of periodic defects in the defect map.

17 Claims, 21 Drawing Sheets

(58) Field of Classification Search
CPC .......... G06T 7/0004; G06T 1/00; G06T 7/00; G01N 21/892; G01N 21/8851; G01N 2021/8883; G01N 2021/8887; G01N 2021/8918; G01N 21/8922; G01N 2021/8924; G06N 20/00; G06N 3/045; G06N 3/048; G06N 3/08; G06V 10/454; G06V 2201/06; G06V 10/82
See application file for complete search history.

(56) References Cited

U.S. PATENT DOCUMENTS

| | | | |
|---|---|---|---|
| 7,324,681 | B2 | 1/2008 | Chang et al. |
| 7,460,703 | B2 | 12/2008 | Chang et al. |
| 7,627,163 | B2 | 12/2009 | Chang et al. |
| 10,769,774 | B2 | 9/2020 | Leng et al. |
| 2004/0105001 | A1* | 6/2004 | Chang .................. G01N 21/952 348/92 |
| 2005/0002560 | A1* | 1/2005 | Yamamoto ............. G06V 10/25 382/156 |
| 2006/0002605 | A1* | 1/2006 | Chang .................. G01N 21/952 382/141 |
| 2008/0063426 | A1* | 3/2008 | Chang .................. G01N 21/952 399/98 |
| 2009/0046923 | A1 | 2/2009 | Chang et al. |
| 2018/0307203 | A1* | 10/2018 | Aizawa ............... G05B 19/4065 |
| 2019/0213734 | A1* | 7/2019 | Leng .................... G06V 10/764 |
| 2019/0360942 | A1* | 11/2019 | Kano ....................... G06N 3/08 |
| 2020/0175352 | A1* | 6/2020 | Cha ......................... G06N 3/04 |
| 2020/0402221 | A1* | 12/2020 | Ijiri ........................ G06N 3/084 |
| 2020/0410709 | A1* | 12/2020 | Suzuki ................... G06N 3/084 |
| 2022/0044383 | A1* | 2/2022 | Koshihara ............ G06V 10/454 |
| 2022/0067434 | A1* | 3/2022 | Nakagawa ......... G01N 21/8851 |

FOREIGN PATENT DOCUMENTS

| | | | |
|---|---|---|---|
| CN | 108242054 A | | 7/2018 |
| EP | 3 315 950 A1 | | 5/2018 |
| JP | S58-156842 A | | 9/1983 |
| JP | H05164701 A | * | 6/1993 |
| JP | H07-198627 A | | 8/1995 |
| JP | H11-311647 A | | 11/1999 |
| JP | 2004-245720 A | | 9/2004 |
| JP | 2004-354250 A | | 12/2004 |
| JP | 2006-105791 A | | 4/2006 |
| JP | 2009-265087 A | | 11/2009 |
| JP | 2010-139317 A | | 6/2010 |
| JP | 2010-185868 A | | 8/2010 |
| JP | 5733879 B2 | * | 6/2015 |
| JP | 2015-215183 A | | 12/2015 |
| JP | 2016145887 A | * | 8/2016 |
| JP | 2018-005640 A | | 1/2018 |
| KR | 102021944 B1 | * | 9/2019 |
| RU | 2 320 958 C2 | | 3/2008 |
| WO | 2018/165753 A1 | | 9/2018 |

OTHER PUBLICATIONS

Feb. 4, 2020 International Search Report issued in International Patent Application No. PCT/JP2019/042848.
Marcin Kopaczka et al.; "Automated Enhancement and Detection of Stripe Defects in Large Circular Weft Knitted Fabrics"; 2016 IEEE 21st International Conference on Emerging Technologies and Factory Automation (ETFA); 2016.
Francisco G. Bulnes et al.; "Vision-Based Sensor for Early Detection of Periodical Defects in Web Materials"; Sensors; 2012; vol. 12; pp. 10788-10809.
Yong-Ju Jeon et al.; "Detection of Periodic Defects Using Dual-Light Switching Lighting Method on the Surface of Thick Plates"; ISIJ International; 2015; vol. 55; No. 9; pp. 1942-1949.
Feb. 4, 2020 Written Opinion issued in International Patent Application No. PCT/JP2019/042848.
May 24, 2022 Office Action issued in Russian Patent Application No. 2021121859.
Bulnes et al., "Periodic defects in steel strips: Detection through a Vision-Based Technique," IEEE Industry Applications Magazine, IEEE Service Center, vol. 19, No. 2, Mar. 2013 pp. 39-46.
Yi et al., "An End-to-End Steel Strip Surface Defects Recognition System Based on Convolutional Neural Networks," Steel Research International, vol. 88, No. 2, Feb. 2016, p. 1600068.
Wikipedia, "Artificial neural network," edited on Dec. 19, 2022 [retrieved online] https://en.wikipedia.org/wiki/Artificial_neural_network#Learning.
Wikipedia, "Comparison of Deep Learning Software," edited on Dec. 31, 2017 [retrieved online] https://en.wikipedia.org/w/index.php?%20title=Comparison_of_deep_learning_software&oldid=817932283.
Matlab & Simulink, "Preprocess Images for Deep Learning" [retrieved online Sep. 17, 2018] https://web.archive.org/web/20180917001356/https://www.mathworks.com/help/deeplearning/ug/preprocess-images-for-deep-learning.html.
Mainline Metals Inc., "Roll Mark / Bruise from Hot Strip Mill" [retrieved online Sep. 29, 2020] https://web.archive.org/web/20200929132630/https://mainlinemetals.com/resource-term/roll-mark-bruise-from-hot-strip-mill/.
Wikipedia, "Backpropagation," edited on Jan. 27, 2018 [retrieved online] https://en.wikipedia.org/wiki/%20w/index.php?oldid=822658119&title=Backpropagation.
Wikipedia, "Computer Simulation" [retrieved online] https://ru.wikichi.ru/wiki/Computer_simulation.
V. A. Shterenzon, "Modeling of Technological Processes," Publishing House of the Russian State Vocational Pedagogical University, 2010, 66 pages.
Jan. 2, 2023 Extended Search Report issued in European Patent Application No. 19906072.4.
Nov. 7, 2022 Office Action issued in Russian Patent Application No. 2021121859.
Nov. 28, 2023 Office Action issued in Chinese Patent Application No. 201980086096.9.
Yi Zhao, "Application of Deep Learning in Defects Identification of Silicon Steel Sheet", Digital Technology & Applications, vol. 12, Dec. 15, 2017, pp. 32-34.

* cited by examiner

FIG.6
STEEL SHEET B1
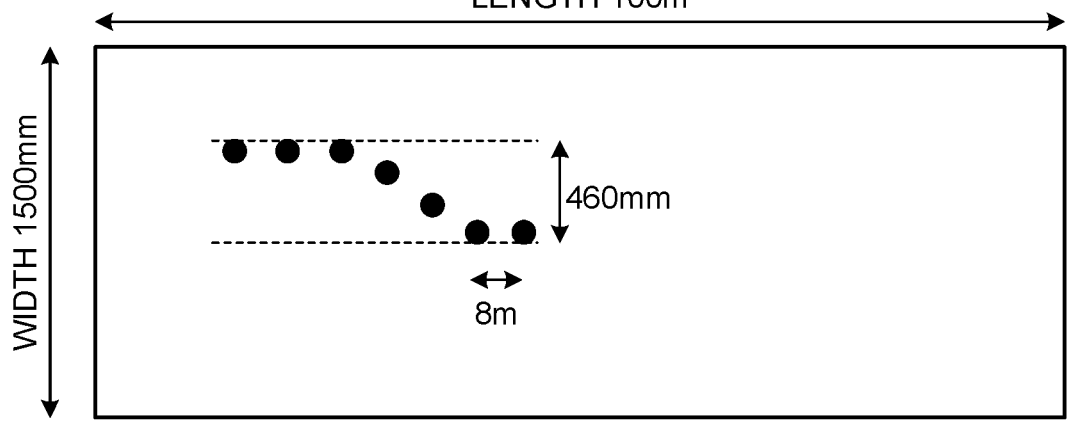
STEEL SHEET B2
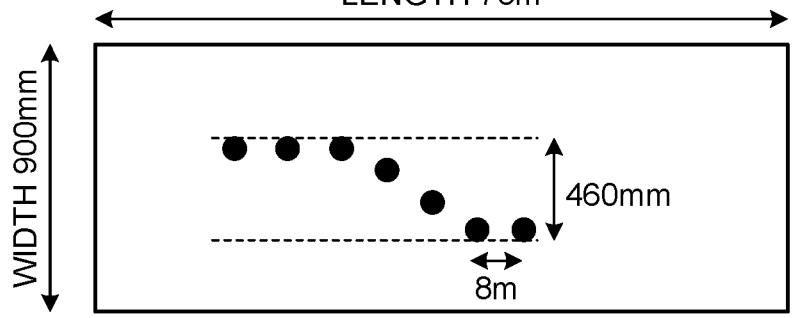

FIG.7
DEFECT MAP C1 (120×240)
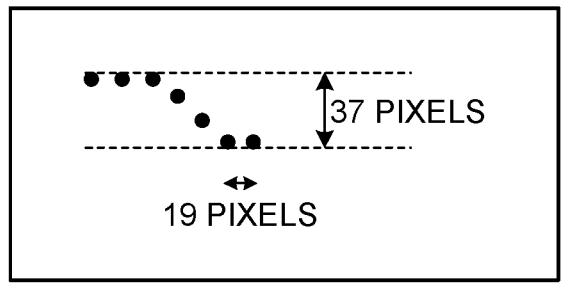
DEFECT MAP C2 (120×240)
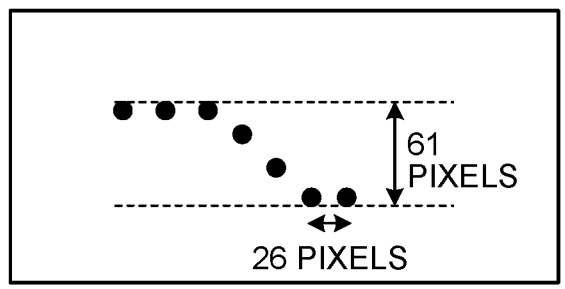

FIG.9

|  | TOTAL DEFECT MAPS | PERIODIC DEFECTS ABSENT | PERIODIC DEFECTS PRESENT |
|---|---|---|---|
| TOTAL DEFECT MAPS | 1544 | 1102 | 442 |
| DEFECT MAPS FOR TEACHER IMAGE | 1230 | 881 | 349 |
| DEFECT MAPS FOR TEST IMAGE | 314 | 221 | 93 |

FIG.10

| | | TEST DETERMINATION RESULT | |
|---|---|---|---|
| | | PERIODIC DEFECTS ABSENT | PERIODIC DEFECTS PRESENT |
| ACTUAL RESULT | PERIODIC DEFECTS ABSENT | 209 | 12 |
| | PERIODIC DEFECTS PRESENT | 13 | 80 |

FIG.11

|  | TEST DETERMINATION RESULT | |
|---|---|---|
|  | PERIODIC DEFECTS ABSENT | PERIODIC DEFECTS PRESENT |
| ACTUAL RESULT — PERIODIC DEFECTS ABSENT | 211 | 10 |
| ACTUAL RESULT — PERIODIC DEFECTS PRESENT | 11 | 82 |

FIG.12

|  | TEST DETERMINATION RESULT | |
|---|---|---|
|  | PERIODIC DEFECTS ABSENT | PERIODIC DEFECTS PRESENT |
| ACTUAL RESULT — PERIODIC DEFECTS ABSENT | 844 | 258 |
| ACTUAL RESULT — PERIODIC DEFECTS PRESENT | 41 | 401 |

| IMAGE SIZE (PIXELS) | CORRECT ANSWER RATE (%) | NUMBER OF EPOCHS |
|---|---|---|
| 30x60 | 90.45 | 46 |
| 60x120 | 93.95 | 66 |
| 120x240 | 94.59 | 61 |
| 240x480 | 92.04 | 32 |
| 480x960 | 88.85 | 48 |

FIG.21
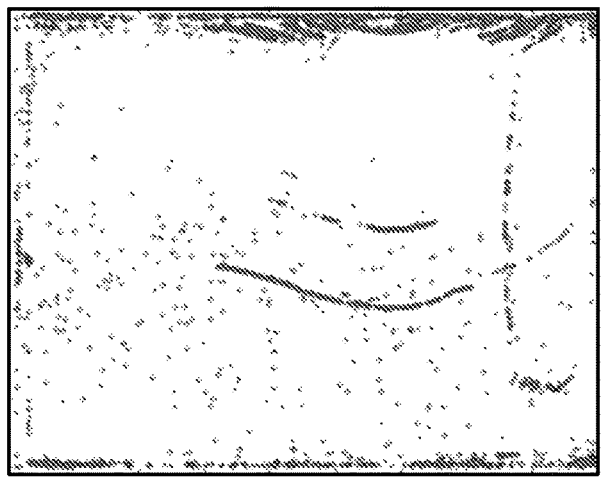
(a)
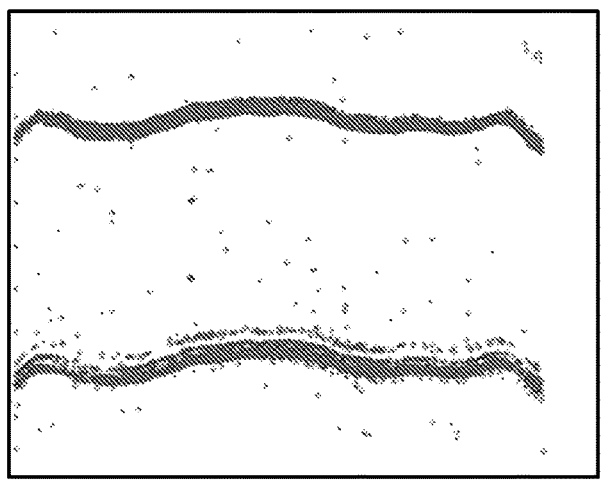
(b)
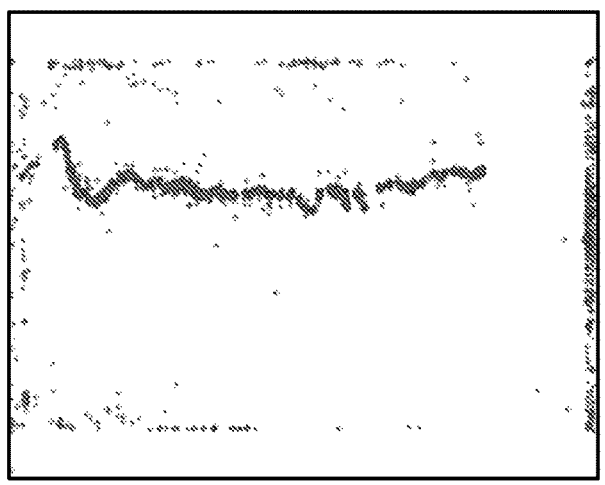
(c)

FIG.22
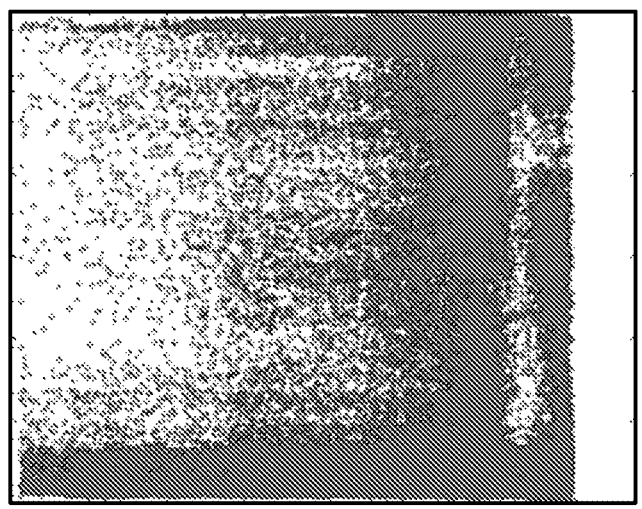
(a)
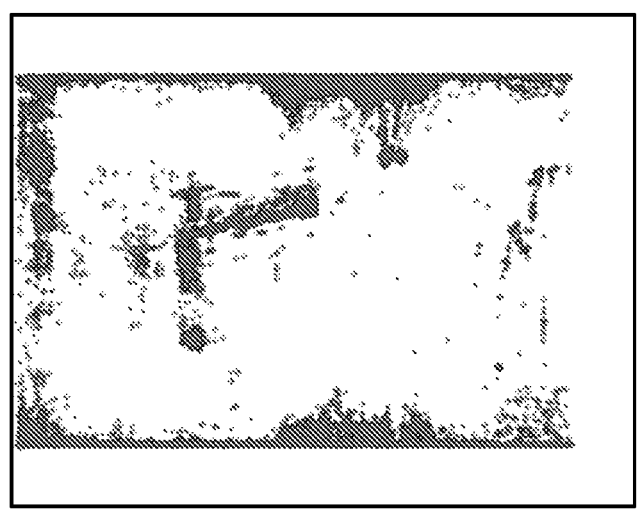
(b)

LEARNED MODEL GENERATION METHOD, LEARNED MODEL, SURFACE DEFECT INSPECTION METHOD, STEEL MANUFACTURING METHOD, PASS/FAIL DETERMINATION METHOD, GRADE DETERMINATION METHOD, SURFACE DEFECT DETERMINATION PROGRAM, PASS/FAIL DETERMINATION PROGRAM, DETERMINATION SYSTEM, AND STEEL MANUFACTURING EQUIPMENT

FIELD

The present invention relates to a learned model generation method, a learned model, a surface defect inspection method, a steel manufacturing method, a pass/fail determination method, a grade determination method, a surface defect determination program, a pass/fail determination program, a determination system, and steel manufacturing equipment.

BACKGROUND

In a steel-sheet manufacturing line, an inspection of surface defects is performed for quality assurance and quality control of the product surface. In recent years, the introduction of determination systems has progressed, and automation and labor-saving of the inspection have been devised. The mainstream steel determination systems that have been introduced in recent years are inspection systems consisting mainly of an optical system with lighting and a camera and an image processing system. These detect a defect based on the difference in the amount of light received caused by the scattering of light in a defect portion.

In the case of a rolled steel sheet, a deposit or a defect on a roll surface may be transferred to the steel sheet, causing defects on the surface of the steel sheet. These defects are called periodic defects, in a steel strip that is a long steel sheet, as they occur having periodicity over the entire length. The periodic defects lead to a large number of occurrences once they occur due to their cause. Although the periodic defects are extremely harmful, their detection is not easy as the individual defects are so small. Furthermore, on a high-speed line for which the speed of passing the steel strip is high, the detection of periodic defects is further difficult.

In addition, it is known that, because the position of the periodic defects in the width direction (direction orthogonal to the flow of the steel sheet) moves significantly when the steel sheet meanders while passing, it is difficult to detect periodic defects as the defects having periodicity in the flow direction.

Moreover, due to the convenience of the manufacturing process, it may need to examine the periodic defects at a line downstream of the line where the periodic defects are actually occurring. For example, applicable is the case where periodic defects in a pickling line are examined in a CAL (Continuous Annealing Line) after cold rolling. As just described, when the inspection line and the defect occurring line are different, it is further difficult to determine the influence of the meandering of the steel sheet that occurred in the defect occurring line from the positional information on the defect portion detected in the inspection line.

As a method of detecting periodic defects even when the steel sheet meanders, a method of setting an allowable width in the width direction has been known. Specifically, when a defect is detected, by setting a constant allowable width from the defect in the width direction and determining the defects that occur periodically (for example, three or more) within this allowable width to be periodic defects, the periodic defects can be detected even when the steel sheet meanders.

Patent Literature 1 offers a method of detecting periodic defects by calculating an autocorrelation coefficient in the flow direction of the steel sheet on a light-receiving signal in the width direction.

In Patent Literature 2, for each type of defect, an evaluation value of the defect and whether the relevant defect type is a periodic defect type are set in advance. In addition, for the periodic defect type, a threshold value for the total value of the evaluation values is set in advance. Then, the signal level for detecting defects (threshold value for defect detection) is set close to the noise level and the defect type of the detected defect is determined, and if the relevant defect type is determined to be periodic defects, when the relevant defects continuously occur a certain number of times or more at the same pitch and when the total value of the evaluation values is greater than or equal to the threshold value for the total value of the evaluation values set in advance, the method offered in Patent Literature 2 determines the relevant defects to be periodic defects.

Patent Literature 3 offers a method of detecting periodic defects by arranging, based on a two-dimensional map of a signal measured in a leakage-magnetic flux method that, by magnetizing a subject, detects the magnetic flux leaked from the subject, a plurality of small areas of substantially the same size as defects at equal intervals corresponding to the roll pitch and by performing a correlation calculation between the areas.

CITATION LIST

Patent Literature

Patent Literature 1: Japanese Patent Application Laid-open No. S58-156842

Patent Literature 2: Japanese Patent Application Laid-open No. H07-198627

Patent Literature 3: Japanese Patent Application Laid-open No. 2009-265087

SUMMARY

Technical Problem

As the method of setting the allowable width and the method described in Patent Literature 2 focus on the position of the defect in the width direction and evaluate the displacement amount of the defect in the width direction, they are greatly affected by the meandering of the steel sheet. As a result, when the displacement amount of the position in the width direction is large due to the meandering of the steel sheet, determining to be periodic defects may be not possible. Meanwhile, when the allowable width for the displacement in the width direction is increased, the defects that are not periodic defects are detected (over-detected) as periodic defects.

The method described in Patent Literature 1 needs to store all signals in the width direction and calculate autocorrelation on all roll pitches for which this signal is to be detected, and thus needs a significantly large storage capacity and calculation time. Furthermore, in the method described in Patent Literature 1, when a large number of defects are detected by adjusting the sensitivity, over-detection may occur, and among them, the defects may be recognized as a large number of periodic defects by autocorrelation calculation and true periodic defects may be not found.

Although the method described in Patent Literature 3 is, unlike Patent Literature 1 and 2, a technique related to the leakage-magnetic flux method, even in this method, as a plurality of small areas are located at the same position in the width direction at equal intervals, the periodic defects cannot be detected when the steel sheet greatly meanders.

The present invention has been made in view of the above-described problems and an object thereof is to provide a learned model generation method, a learned model, a surface defect inspection method, a steel manufacturing method, a pass/fail determination method, a grade determination method, a surface defect determination program, a pass/fail determination program, a determination system, and steel manufacturing equipment that are able to detect periodic defects with high accuracy even if the steel sheet is meandering.

Solution to Problem

To solve the problem and achieve the object, a learned model generation method includes: using a teacher image including a defect map that is an image indicating a distribution of a defect portion of a surface of steel and having an equal image size, and presence/absence of periodic defects assigned in advance to the defect map; and generating a learned model by machine learning, the learned model for which: an input value is a defect map that is an image indicating a distribution of a defect portion of a surface of steel and having an image size of the equal image size; and an output value is a value concerning the presence/absence of periodic defects in the defect map.

Moreover, in the learned model generation method according to the present invention, when an image size of the defect map used as the input value is different from the equal image size, the image size of the defect map is converted into the equal image size to use the defect map as the input value.

Moreover, in the learned model generation method according to the present invention, the learned model is being generated by using a test image including a defect map that is an image indicating a distribution of a defect portion of a surface of steel and having the equal image size as the teacher image, and presence/absence of periodic defects assigned to the defect map in advance, wherein the method includes: inputting the defect map of the test image into the learned model to output a value concerning presence/absence of periodic defects in the test image;

determining the presence/absence of periodic defects in the test image based on the value concerning the presence/absence of periodic defects; calculating a correct answer rate by comparing the determined presence/absence of periodic defects with the presence/absence of periodic defects assigned in advance; and adjusting a generation condition of the learned model according to the calculated correct answer rate.

Moreover, in the learned model generation method according to the present invention, adjusting the generation condition of the learned model is to change the equal image size to another equal image size of different image size.

Moreover, the learned model generation method according to the present invention, further includes:

setting a plurality of types of equal image size different from one another in size as the equal image size; calculating the correct answer rate for each type of the equal image size by using a pair of the teacher image and the test image of each of the set equal image sizes; and generating the learned model by using the teacher image and the test image that have the equal image size having a highest calculated correct answer rate.

Moreover, a learned model according to the present invention includes: an input layer configured to be input, as a determination image, a defect map that is an image indicating a distribution of a defect portion of a surface of steel and having an equal image size; an output layer configured to output a value concerning presence/absence of periodic defects for the determination image; and an intermediate layer for which parameters have been learned by using a teacher image, the teacher image for which: an input is a defect map having the equal image size as an image size of the determination image; and an output is a value concerning the presence/absence of periodic defects for the defect map, wherein the learned model causes a computer to function to: input a determination image of the equal image size into the input layer; calculate in the intermediate layer; and output the value concerning the presence/absence of periodic defects from the output layer.

Moreover, a surface defect inspection method according to the present invention includes: a step of acquiring imaged data for which a surface of steel has been captured; a step of creating a defect map indicating a distribution of a defect portion based on the imaged data; a step of creating a determination image for each defect map by converting an image size of the defect map into an equal image size; and a step of determining, by inputting the determination image into a learned model and outputting a value concerning presence/absence of periodic defects, the presence/absence of periodic defects for the determination image based on the value concerning the presence/absence of periodic defects.

Moreover, in the surface defect inspection method according to the present invention, the learned model has been subjected to machine learning by using a teacher image of an equal image size as an image size of the determination image such that the value concerning the presence/absence of periodic defects is output when the determination image is input.

Moreover, a steel manufacturing method according to the present invention includes: detecting periodic defects on a surface of a steel using the surface defect inspection method according to the present invention; and manufacturing steel by controlling a manufacturing condition based on the detection result.

Moreover, a pass/fail determination method according to the present invention includes: a step of acquiring imaged data for which a surface of steel has been captured; a step of creating a defect map indicating a distribution of a defect portion based on the imaged data; a step of creating a determination image for each defect map by converting an image size of the defect map into an equal image size; and a step of determining, by inputting the determination image into a learned model and outputting a value concerning presence/absence of periodic defects, a pass/fail of the steel based on the value concerning the presence/absence of periodic defects.

Moreover, in the pass/fail determination method according to the present invention, the learned model has been subjected to machine learning by using a teacher image of an equal image size as an image size of the determination image such that the value concerning the presence/absence of periodic defects is output when the determination image is input.

Moreover, a steel manufacturing method according to the present invention includes: determining a pass/fail of the steel using the pass/fail determination method according to the present invention; and manufacturing steel by controlling a manufacturing condition based on the determination result.

Moreover, a grade determination method according to the present invention includes: a step of acquiring imaged data for which a surface of steel has been captured; a step of creating a defect map indicating a distribution of a defect portion based on the imaged data; a step of creating a determination image for each defect map by converting an image size of the defect map into an equal image size; a step of determining, by inputting the determination image into a learned model and outputting a value concerning presence/absence of periodic defects, the presence/absence of periodic defects for the determination image based on the value concerning the presence/absence of periodic defects; a step of calculating a defect mixing rate of the determination image based on the defect portion; and a step of determining a grade of the steel corresponding to the determination image, based on the calculated defect mixing rate and a determination result of the presence/absence of periodic defects for the determination image.

Moreover, a grade determination method according to the present invention includes: a step of acquiring imaged data for which a surface of steel has been captured;

a step of creating a defect map indicating a distribution of a defect portion based on the imaged data; a step of creating a determination image for each defect map by converting an image size of the defect map into an equal image size; a step of determining, by inputting the determination image into a learned model and outputting a value concerning presence/absence of periodic defects, a pass/fail of the steel based on the value concerning the presence/absence of periodic defects; a step of calculating a defect mixing rate of the determination image based on the defect portion; and a step of determining a grade of the steel corresponding to the determination image, based on the calculated defect mixing rate and a determination result of pass/fail for the steel.

Moreover, a steel manufacturing method according to the present invention includes a sorting step of sorting steel for each grade by using the grade determination method according to the present invention.

Moreover, a surface defect determination program according to the present invention is the program that causes a computer to perform processing including: a step of acquiring imaged data for which a surface of steel has been captured; a step of creating a defect map indicating a distribution of a defect portion based on the imaged data; a step of creating a determination image for each defect map by converting an image size of the defect map into an equal image size; and a step of determining, by inputting the determination image into a learned model and outputting a value concerning presence/absence of periodic defects, the presence/absence of periodic defects for the determination image based on the value concerning the presence/absence of periodic defects.

Moreover, a pass/fail determination program according to the present invention is the program that causes a computer to perform processing including: a step of acquiring imaged data for which a surface of steel has been captured; a step of creating a defect map indicating a distribution of a defect portion based on the imaged data;

a step of creating a determination image for each defect map by converting an image size of the defect map into an equal image size; and a step of determining, by inputting the determination image into a learned model and outputting a value concerning presence/absence of periodic defects, a pass/fail of the steel based on the value concerning the presence/absence of periodic defects.

Moreover, a determination system according to the present invention includes: a defect map creation unit configured to create a defect map indicating a distribution of a defect portion based on imaged data for which a surface of steel has been captured; a size conversion unit configured to convert an image size of the defect map into an equal image size to create a determination image for each defect map; a periodic-defect determination unit configured to input the determination image into a machine-learned learned model and output a value concerning presence/absence of periodic defects; and a determination unit configured to determine the presence/absence of periodic defects for the determination image and/or determine a pass/fail of the steel, based on the value concerning the presence/absence of periodic defects, wherein the learned model has been subjected to machine learning by using a teacher image of the equal image size as an image size of the determination image such that the value concerning the presence/absence of periodic defects is output when the determination image is input.

Moreover, steel manufacturing equipment according to the present invention is the equipment including the determination system according to the present invention.

Advantageous Effects of Invention

According to the present invention, it is possible to provide a learned model generation method, a learned model, a surface defect inspection method, a steel manufacturing method, a pass/fail determination method, a grade determination method, a surface defect determination program, a pass/fail determination program, a determination system, and steel manufacturing equipment that are able to detect periodic defects with high accuracy even if the steel sheet is meandering.

BRIEF DESCRIPTION OF DRAWINGS

FIG. 6 is a diagram illustrating one example of a defect map before converting an image size.

FIG. 7 is a diagram illustrating one example of a defect map after converting the image size.

FIG. 9 is a diagram illustrating one example of the number of defect maps for teacher images and defect maps for test images that were prepared.

FIG. 10 is a diagram illustrating one example of a test determination result.

FIG. 11 is a diagram illustrating another example of the test determination result.

FIG. 12 is a diagram illustrating one example of a test determination result according to the prior art.

FIG. 21 is a diagram illustrating one example of defect maps that include periodic defects.

FIG. 22 is a diagram illustrating one example of defect maps that do not include periodic defects.

DESCRIPTION OF EMBODIMENTS

With reference to the accompanying drawings, a learned model generation method, a learned model, a surface defect inspection method, a steel manufacturing method, a pass/fail determination method, a grade determination method, a surface defect determination program, a pass/fail determination program, a determination system, and steel manufacturing equipment that are exemplary embodiments of the present invention will be described. First, the outline of the determination system will be described. Next, a learned model for detecting surface defects used in this determination system will be described. Thereafter, the generation method for this learned model will be described. Then, a surface defect inspection method using the learned model, the steel manufacturing method using the surface defect inspection method, a pass/fail determination method, the steel manufacturing method using the pass/fail determination method, steel manufacturing equipment, and a grade determination method will be described in the foregoing order.

The present invention can be applied to steel in general as long as the steel may have periodic defects, but in the following, a steel sheet P as an example will be described. The steel sheet P is a steel sheet manufactured through processes that may be affected by meandering, such as a cold-rolled steel sheet, a surface-treated steel sheet, a pickled steel sheet, a hot-rolled steel sheet, an electromagnetic steel sheet, and the like, for example. In addition, the present invention can also be applied to a steel strip that is a long steel sheet. When applied to steel strips, the effect of preventing the product quality from being significantly impaired due to periodic defects which tend to occur over an extended range is particularly noticeable.

First Embodiment

Steel Determination System

Figure 1:
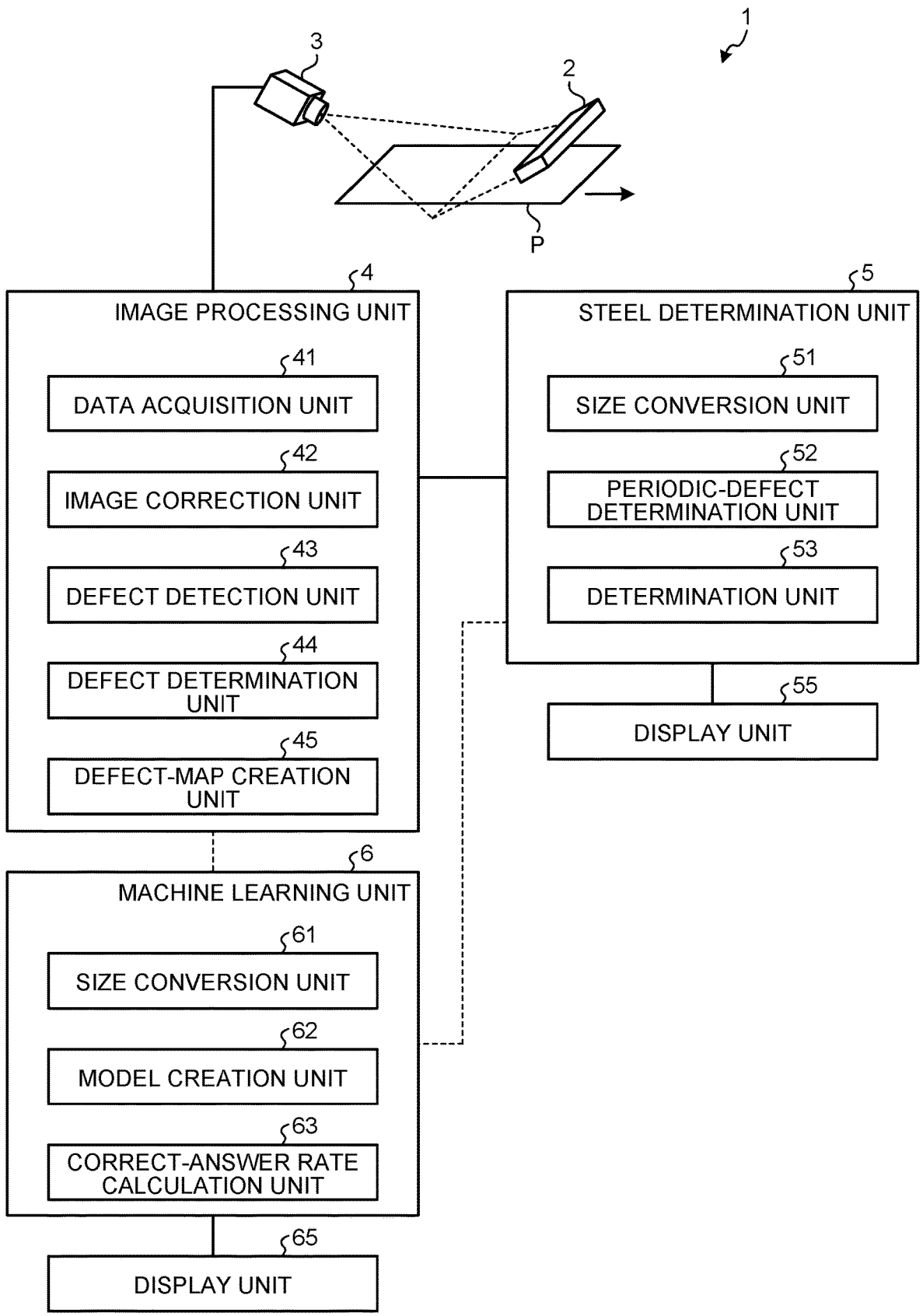
FIG. 1 is a schematic diagram illustrating a configuration of a steel determination system according to a first embodiment of the present invention.

FIG. 1 is a schematic diagram illustrating a configuration of a steel determination system according to a first embodiment of the present invention. As illustrated in FIG. 1, a steel determination system 1 in the first embodiment of the present invention includes a lighting device 2, an imaging device 3, an image processing unit 4, and a steel determination unit 5.

The steel determination system 1 is a determination system for the steel sheet P that determines whether there are periodic defects on the surface of the steel sheet P using a learned model, which will be described later.

The lighting device 2 illuminates, as a light source, the surface of the steel sheet P that is an object of examination of the steel determination system 1. The lighting device 2 only needs to be a light source used in the steel determination system 1, and is an LED light source, an incandescent light source, a strobe, or a metal-halide light source, for example.

The imaging device 3 images the surface of the steel sheet P illuminated by the lighting device 2, and thereafter, transmits electronic data of the obtained image of the surface of the steel sheet P to the image processing unit 4. The imaging device 3 may be either what is called a line sensor camera having a one-dimensional imaging element or what is called an area camera having a two-dimensional imaging element, but in either case, imaging is performed in synchronization with the transportation of the steel sheet P. When the imaging device 3 is a line sensor camera, continuous lighting illumination is used as the lighting device 2. When the imaging device 3 is an area camera, flash illumination that emits a flash every time the steel sheet P advances a certain distance is used as the lighting device 2. The imaging element used for the imaging device 3 may be a CCD (Charge Coupled Device) but may be a CMOS (Complementary Metal Oxide Semiconductor). The imaging device 3 may image either the specular reflection or the diffuse reflection of the illumination. Although FIG. 1 illustrates one set of light source and camera, there may be multiple light sources and multiple cameras. For example, it may be an optical system of two sets in which one set of light source and camera is placed in specular reflection and another set of light source and camera is placed in diffuse reflection. Moreover, each of two sets of light source and camera may be placed in diffuse reflection, or three sets or more of light source and camera may be combined. Furthermore, imaging may be performed, by dividing the width direction of the steel sheet P into a plurality of parts and by separating into a plurality of sets of light source and camera, and the images may then be combined later. Normally, between the light source and the camera, various optical elements such as a colored glass filter, an IR cut filter, a polarizing filter, and the like are placed, but are omitted in FIG. 1.

The image processing unit 4 analyzes the image data of the surface of the steel sheet P transmitted from the imaging device 3, and detects surface defects on the surface of the steel sheet P if any, and determines the type and the degree of harmfulness of the surface defects, and then outputs the relevant information to the steel determination unit 5.

The image processing unit 4 includes therein a data acquisition unit 41, an image correction unit 42, a defect detection unit 43, a defect determination unit 44, and a defect-map creation unit 45. The image processing unit 4 is implemented using various arithmetic circuits such as a central processing unit (CPU) and a storage device such as a memory and a hard disk. Each block in the image processing unit 4 is implemented by a program executed by an arithmetic circuit. That is, the image processing unit 4, through the execution of this program, functions as the data acquisition unit 41, the image correction unit 42, the defect detection unit 43, the defect determination unit 44, and the defect-map creation unit 45.

The steel determination unit 5 includes therein a size conversion unit 51, a periodic-defect determination unit 52, and a determination unit 53. The steel determination unit 5 is implemented using various arithmetic circuits such as a CPU and a storage device such as a memory and a hard disk. Each block in the steel determination unit 5 is implemented by a program executed by an arithmetic circuit. That is, the steel determination unit 5, through this program, functions as the size conversion unit 51, the periodic-defect determination unit 52, and the determination unit 53. In addition, the steel determination unit 5 is provided with a display unit 55 having a display panel made of liquid crystal, organic electro luminescence (EL), or the like.

The steel determination system 1 may include a machine learning unit 6 as needed. The machine learning unit 6 includes therein a size conversion unit 61, a model creation unit 62, and a correct-answer rate calculation unit 63. The machine learning unit 6 is implemented using various arithmetic circuits such as a CPU and a storage device such as a memory and a hard disk. Each block in the machine learning unit 6 is implemented by a program executed by an arithmetic circuit. That is, the machine learning unit 6, through this program, functions as the size conversion unit 61, the model creation unit 62, and the correct-answer rate calculation unit 63. In addition, the machine learning unit 6 is provided with a display unit 65 having a display panel made of liquid crystal, organic EL, or the like.

The image processing unit 4, the steel determination unit 5, and the machine learning unit 6 may be configured to be made up of separate computers. In this case, the image processing unit 4, the steel determination unit 5, and the machine learning unit 6 each have an input unit such as a mouse and a keyboard (not illustrated) and a display unit. In FIG. 1, the display unit 55 of the steel determination unit 5 and the display unit 65 of the machine learning unit 6 are illustrated, but the input units or the display unit of the image processing unit 4 are not illustrated.

Furthermore, in FIG. 1, the image processing unit 4 and the steel determination unit 5 are electrically connected. Thus, the electronic data such as a defect map, a defect portion, and the like, which will be described later, created in the image processing unit 4 can be transmitted from the image processing unit 4 to the steel determination unit 5.

The machine learning unit 6 can be electrically connected to each of the image processing unit 4 and the steel determination unit 5 when needed. For example, when relearning of a learned model is needed, the backup data of the defect map from the image processing unit 4 and the electronic data of the presence/absence of periodic defects corresponding to the defect map from the steel determination unit 5 can each be input to the machine learning unit 6. Then, the learned model subjected to relearning by the machine learning unit 6 can be output as electronic data from the machine learning unit 6 to the steel determination unit 5.

Furthermore, the model creation unit 62 of the machine learning unit 6 may use cloud computing. In this case, the model creation unit 62 is connected to the size conversion unit 61 and the correct-answer rate calculation unit 63 via a network (for example, the Internet, a local area network, and the like). Furthermore, in this case, the size conversion unit 61 and the correct-answer rate calculation unit 63 may also use the same or separate cloud computing. Conversely, it may be not necessary to include the size conversion unit 61 and the correct-answer rate calculation unit 63. When the learned model is provided by a vendor (a company providing products to users), a manufacturer, or the like using the cloud computing and the like, the model creation unit 62 of the machine learning unit 6 may be not provided. In this case, if the size conversion unit 61 and the correct-answer rate calculation unit 63 are not further provided, the steel determination system 1 is a system not provided with the machine learning unit 6.

Furthermore, the image processing unit 4, the steel determination unit 5, and the machine learning unit 6 may be configured to be made up of a single computer, or among the image processing unit 4, the steel determination unit 5, and the machine learning unit 6, any two may be configured to be made up of a single computer. When the steel determination unit 5 and the machine learning unit 6 are made up of a single computer, the size conversion unit 51 and the size conversion unit 61 may be the same unit. In addition, the display units 65 and 55 may be the same unit.

Conversely, the image processing unit 4, the steel determination unit 5, and the machine learning unit 6 may each be configured to be made up of one or more computers. When performing a process for which a load on the arithmetic circuit is high, it is desirable to be configured with one or more computers. In particular, it is desirable that the machine learning unit 6 that generates the learned model, which will be described later, be configured with one or more computers. This computer also includes those using cloud computing.

Learned Model

Next, a learned model used by the first embodiment of the present invention for detecting periodic defects will be described. The learned model of the present invention is assumed to be used as a program module that is a part of artificial intelligence software, and is used in a computer that includes a CPU and a storage device (in the present specification, the steel determination unit 5). The learned model is a learned model for which a defect map that is the equal image size as the image size of the defect map of teacher image is an input value and a value concerning the presence/absence of periodic defects in the relevant defect map is an output value. A defect map is an image indicating the two-dimensional distribution of defect portions determined to be harmful defects. In other words, the defect map is an image in which defect portions are plotted by dots.

Figure 2:
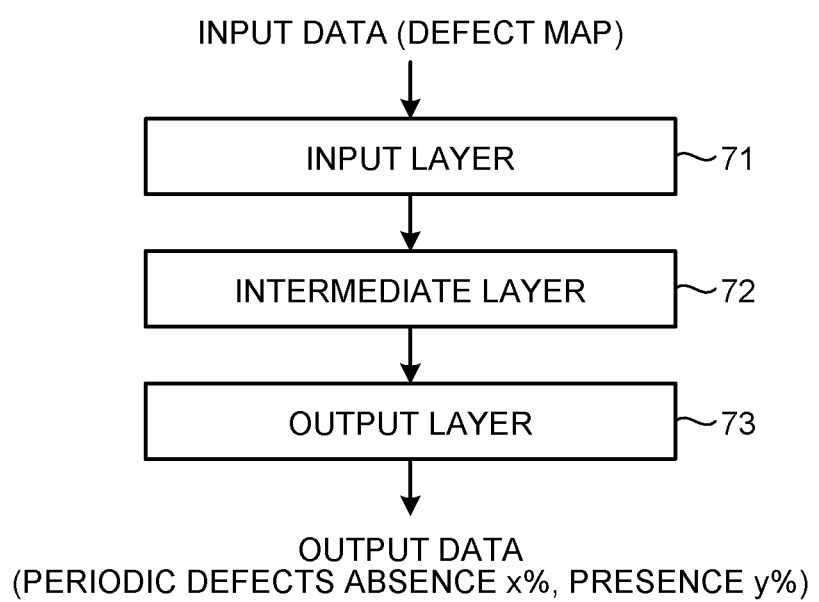
FIG. 2 is a schematic diagram illustrating a configuration of a learned model.

FIG. 2 is a schematic diagram illustrating the configuration of the learned model. The learned model in FIG. 2 includes an input layer 71, an intermediate layer 72, and an output layer 73. In this case, in the input layer 71, a defect map that is an image indicating the distribution of defect portions on the surface of the steel sheet P and is of the equal image size as that of the teacher image is input as a determination image. In the intermediate layer 72, by using the teacher image for which a defect map of the equal image size as that of the determination image is an input and a value concerning the presence/absence of periodic defects for the relevant defect map is an output, parameters are learned. From the output layer 73, a value concerning the presence/absence of periodic defects in the determination image is output.

Then, the learned model causes the computer to function so as to input the determination image of the equal image size as that of the teacher image to the input layer 71, calculate in the intermediate layer 72, and output the value concerning the presence/absence of periodic defects from the output layer 73. The determination image is an image that is an object of determining the presence/absence of periodic defects, is an image indicating the two-dimensional distribution of defect portions on the surface of the steel sheet P, and is a defect map of the equal image size as that of the teacher image. The teacher image will be described later. In the following description, the equal image size is the image size when unifying the image sizes of the defect map of the determination image, the teacher image, and a test image, which will be described later, to the equal size. The foregoing learned model can also be paraphrased as a classifier based on the function thereof.

Learned Model Generation Method

Next, the generation method of this learned model will be described. The generation of the learned model only needs to be performed once, and by using the generated learned model, periodic defects on the surface of the steel sheet P can be detected repeatedly. Furthermore, the learned model of the present invention is generated in a computer that includes a CPU and a storage device (in the present specification, the machine learning unit 6). This computer also includes those using cloud computing.

Figure 3:
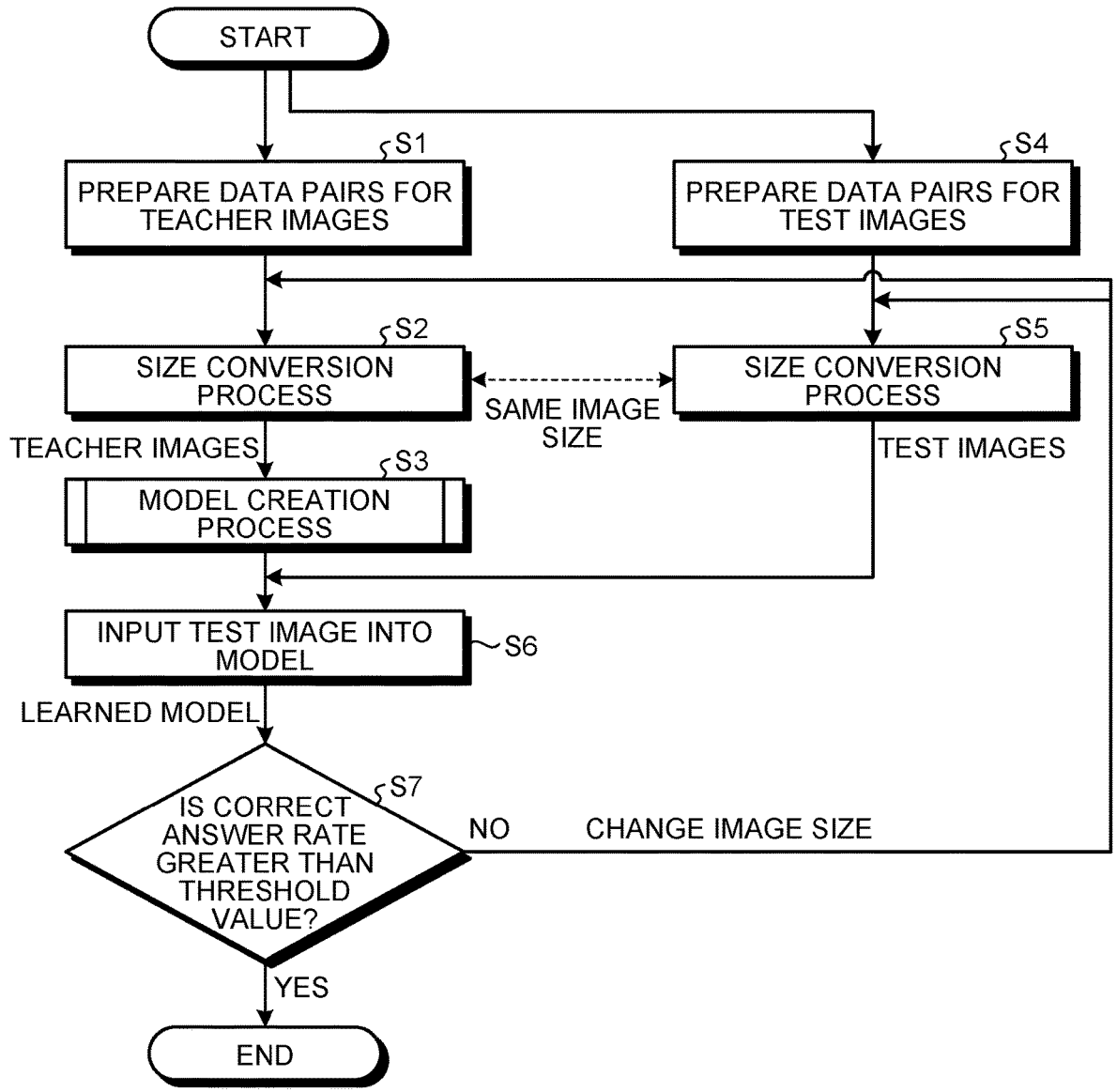
FIG. 3 is a flowchart illustrating a flow of generating the learned model.

FIG. 3 is a flowchart illustrating the flow of generating the learned model. In the first process in FIG. 3, there are two arrows, and this indicates that the processing at Step S1 to Step S3 and the processing at Step S4 and Step S5 may be performed in parallel. In the subsequent flowcharts, two arrows mean the same processing. Furthermore, the branching of an arrow also means the same processing. The processing at Step S4 and Step S5 may be performed, after performing the processing at Step S1 to Step S3. Furthermore, the processing at Step S1 and Step S4 and the processing at Step S2 and Step S5 may each be performed collectively, and thereafter, the processing at Step S3 may be performed.

As illustrated in FIG. 3, first, defect maps and the presence/absence of periodic defects assigned to each of the relevant defect maps in advance are prepared as a plurality of data pairs for teacher images (Step S1). The defect maps for teacher images are created from imaged data for which the surfaces of the steel sheets P of different lengths and widths are imaged in advance.

Figure 4:
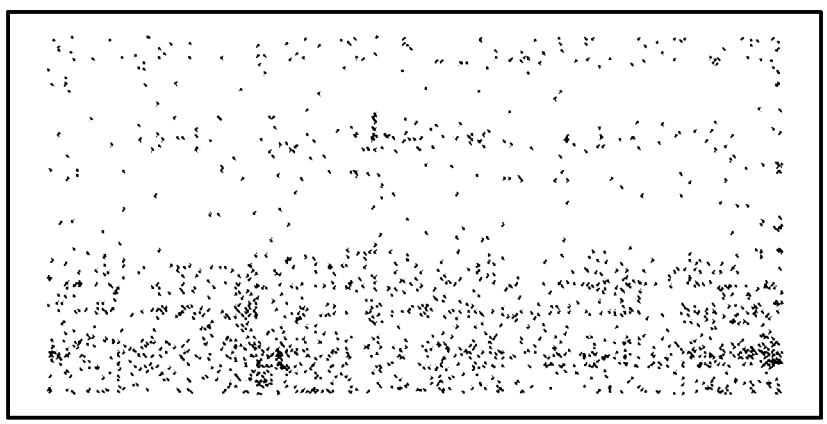
FIG. 4 is a diagram illustrating one example of a defect map.
Figure 5:
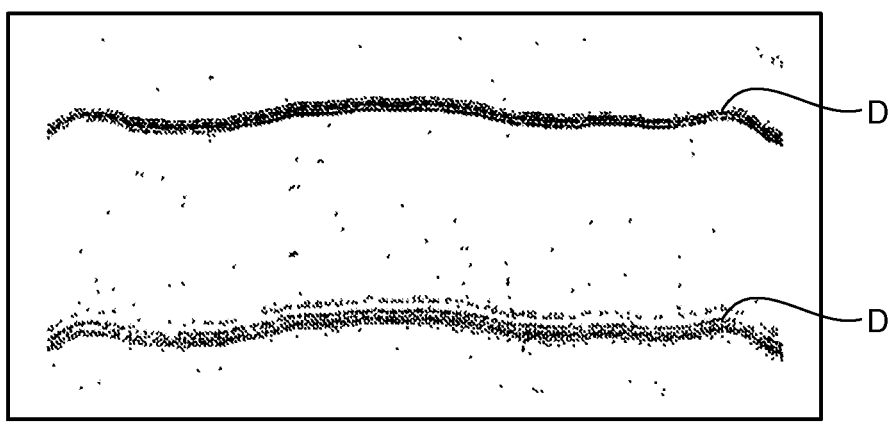
FIG. 5 is a diagram illustrating one example of a defect map.

FIG. 4 and FIG. 5 are diagrams illustrating examples of a defect map. In FIG. 4 and FIG. 5, the portion displayed in black is the defect portion. FIG. 4 is an example of a defect map having no periodic defects, and FIG. 5 is an example of a defect map having periodic defects D. In every defect map prepared in advance, the presence/absence of corresponding periodic defects is created in advance, and each defect map and the presence/absence of the periodic defects in the relevant defect map are associated with each other.

Subsequently, the size conversion unit 61 performs a size conversion process of converting the image size of each defect map included in the data pairs for teacher images into the equal image size (Step S2). By performing this processing, the teacher images that each include the defect map and the presence/absence of periodic defects assigned to the relevant defect map are prepared.

Because the length and width of the steel sheet P vary depending on the manufacturing conditions, the defect map corresponding to the steel sheet P is also different in length and width. FIG. 6 is a diagram illustrating one example of a defect map before converting the image size. As illustrated in FIG. 6, it is assumed that there are a defect map created by imaging a steel sheet B1 having a length of 100 m and a width of 1500 mm and a defect map created by imaging a steel sheet B2 having a length of 75 m and a width of 900 mm, for example. It is assumed that, on the steel sheet B1 and the steel sheet B2, periodic defects having a periodic interval and a meandering amount of similar degrees to a periodic interval of 8 m and a meandering amount of 460 mm have occurred. When steel sheets are manufactured at the same time period using the same manufacturing equipment, the periodic defects that occur are likely to be the same degree of periodic interval and meandering amount.

FIG. 7 is a diagram illustrating one example of the defect map after converting the image size. As illustrated in FIG. 7, the size conversion unit 61 converts each of the defect map corresponding to the steel sheet B1 and the defect map corresponding to the steel sheet B2 into an image size of 120×240 pixels (equal image size). Consequently, on a defect map C1 after the size conversion, periodic defects having a periodic interval of 19 pixels and a meandering amount of 37 pixels have occurred, and on a defect map C2 after the size conversion, periodic defects having a periodic interval of 26 pixels and a meandering amount of 61 pixels have occurred. That is, as the size conversion unit 61 converts the defect maps into the same size, the same effect as that of the machine learning using teacher images including periodic defects of different periods and meandering amounts is obtained. Thus, as the size conversion unit 61 converts the image size of the defect maps for teacher images into the same size to make teacher images, the same effect as that of the machine learning using teacher images including periodic defects of a large variation is obtained, thereby enabling machine learning to be performed efficiently.

For the equal image size for the first time, an appropriately set image size may be used. The machine learning may be performed while the image sizes of the defect maps for teacher images are not unified and suitable image size may be determined based on a result of a correct answer rate, which will be described later, and thereafter, the defect maps for teacher images may be converted into the equal image size by the size conversion unit 61. Furthermore, as the equal image size, a plurality of types of the equal image sizes having different image sizes from one another may be set, the correct answer rate, which will be described later, may be calculated for each of the equal image sizes that have been set, the image size for which the calculated correct answer rate is greater than or equal to a threshold value defined in advance or the highest may be determined, and then the learned model may be generated in the equal image size that has been determined.

In any case, without using the size conversion unit 61, by using another computer or the like, teacher images for which the image size of the defect maps are set to the equal image size in advance may be prepared.

Meanwhile, at Step S4, as with Step S1, defect maps that are images indicating the two-dimensional distribution of defect portions on the surface of the steel sheet P and the presence/absence of periodic defects assigned to each of the relevant defect maps are prepared as a plurality of data pairs for test images. The defect maps for test images are also created, as with the above-described defect maps for teacher images, from imaged data for which the surfaces of the steel sheets P of different lengths and widths are imaged in advance.

Subsequently, at Step S5, as with Step S2, the size conversion unit 61 performs a size conversion process of converting the image size of each defect map included in the data pairs for test images into the equal image size as that of the defect map of the above-described teacher images. By performing this processing, the test images that each include the defect map and the presence/absence of periodic defects assigned to the relevant defect map are prepared.

After preparing the teacher images, the model creation unit 62 performs a model creation process of generating a learned model by machine learning using the teacher images prepared at Step S2 (Step S3). In other words, when the image size of the defect map used as an input value by the model creation unit 62 is different from the equal image size, by the processing at Step S2, the size conversion unit 61 converts the image size of the defect map into the equal image size, before using it as the input value.

The machine learning used in the first embodiment is desirable to be deep learning, and among them in particular, is more desirable to use convolutional neural networks (hereinafter abbreviated to CNN). When these deep learnings are used, especially when CNN is used, it only needs to be provided with a neural network of two or more layers. When CNN is used, the learning model or a classifier can be paraphrased as a convolutional neural network system.

Figure 8:
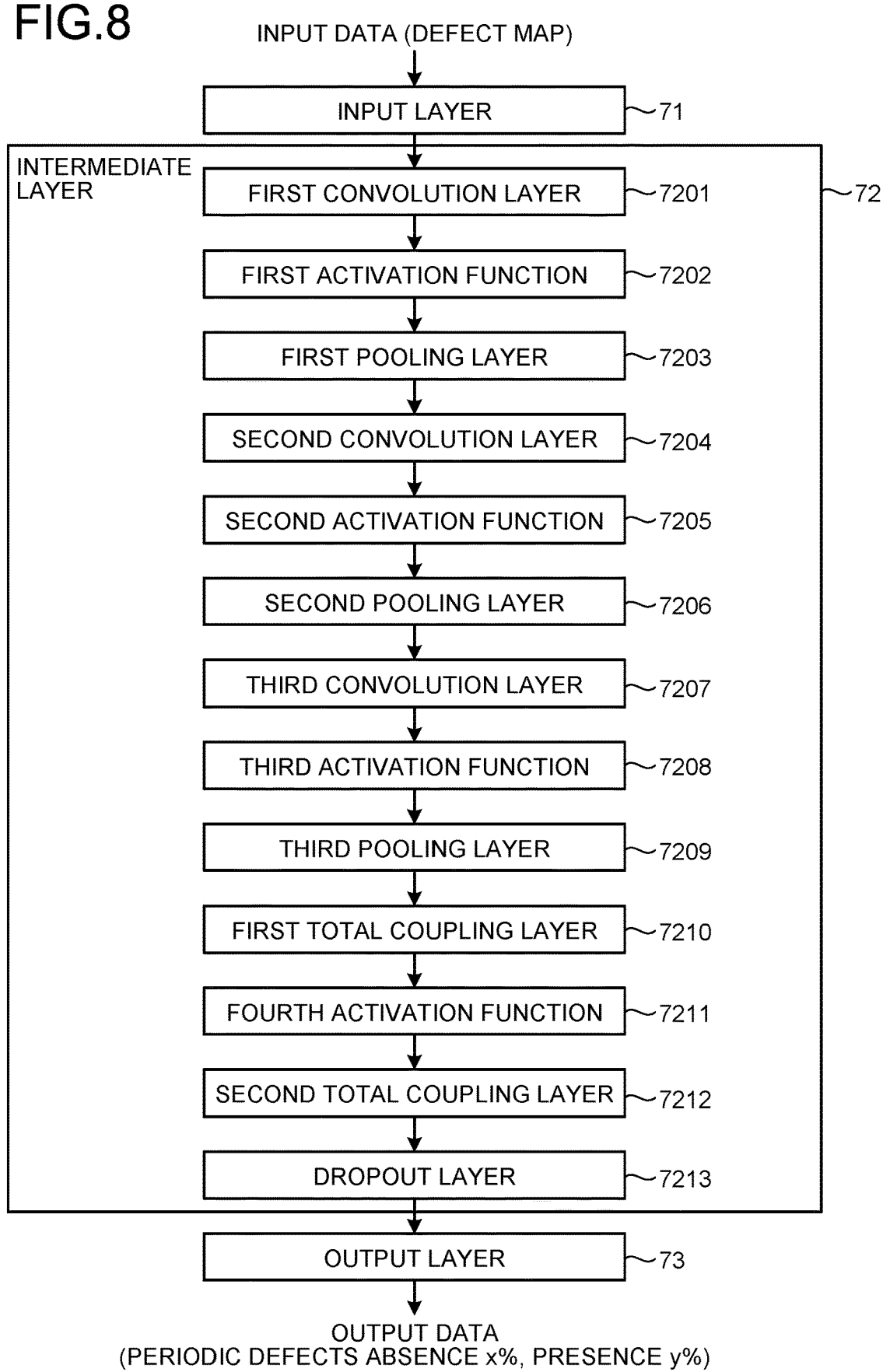
FIG. 8 is a diagram for explaining an example of CNN used in the first embodiment.

An example of CNN used in the first embodiment will be described in detail with reference to FIG. 8. FIG. 8 is an example of implementing a neural network model that associates a defect map, which is a two-dimensional distribution image of defect portions, with the value concerning the presence/absence of periodic defects by using CNN.

First, in the input layer 71, as input data, a defect map of 120×240 pixels is input.

Next, as the intermediate layer 72, a first convolution layer 7201 to a dropout layer 7213 are provided.

First, in the first convolution layer 7201, the feature of the defect map is extracted and data of 120×240×128 ch is created.

Subsequently, in the first activation function 7202, a Rectifier Linear Unit (ReLU) is applied.

In addition, in the first pooling layer 7203, by reducing the size while leaving important information, data of 120×240× 256 ch is created.

Thereafter, in the second convolution layer 7204, the second activation function 7205, and the second pooling layer 7206, the same processing as that of the first convolution layer 7201, the first activation function 7202, and the first pooling layer 7203 is performed and data of 60×120× 256 ch is created.

Moreover, the same processing is performed in the third convolution layer 7207, the third activation function 7208, and the third pooling layer 7209, and data of 30×60×16 ch is created.

Then, in the first total coupling layer 7210, the coupling of nodes is weighted and data of 15×30×16 ch is created.

Moreover, in the fourth activation function 7211, the ReLU is applied.

Thereafter, in the second total coupling layer 7212, the coupling of nodes is weighted and data of 16 ch is created. Then, via the dropout layer 7213, overtraining is prevented.

Finally, as the output data from the output layer 73, a value concerning the presence/absence of periodic defects is output for the defect map that has been input. The value concerning the presence/absence of periodic defects includes a probability x % of the absence of periodic defects from the input defect map and a probability y % of the presence of periodic defects in the input defect map.

After completing the machine learning using a plurality of teacher images, the defect maps of test images are input into the learned model created at Step S3 (Step S6). Then, the learned model outputs the value concerning the presence/absence of periodic defects in the input test image. In addition, the correct-answer rate calculation unit 63 determines, based on the value concerning the presence/absence of periodic defects that the learned model output, the presence/absence of periodic defects in the test image. Thereafter, the correct-answer rate calculation unit 63 compares, on each test image, the presence/absence of periodic defects determined with the presence/absence of periodic defects assigned in advance at Step S4 and calculates the correct answer rate.

Now, an example of a plurality of types of the equal image sizes and the correct answer rate obtained using the total defect maps prepared in FIG. 9 will be described. By this explanation, the technical importance of making the image size of the defect map of the teacher image, the defect map of the test image, and the defect map of the determination image, which will be described later, be the equal image size will be clarified.

FIG. 9 is a diagram illustrating one example of the number of defect maps for teacher images and defect maps for test images that were prepared. As illustrated in FIG. 9, first, 1544 pieces of defect maps (total defect maps) created from imaged data obtained by imaging the surfaces of the steel sheets P having different lengths and widths in advance were prepared. These defect maps have been determined on the presence/absence of periodic defects by humans in advance, and the defect maps that the absence of periodic defects has been determined are 1102 pieces and the defect maps that the presence of periodic defects has been determined are 442 pieces.

Among the total defect maps, 80% (1230 pieces) of the defect maps randomly selected were used for defect maps for teacher images. The data pairs of the defect maps for teacher images and the data of the presence/absence of periodic defects assigned to those are used for creating the learned model by machine learning. In the 1230 pieces of defect maps used for the defect maps for teacher images, 881 pieces of the defect maps that the absence of periodic defects has been determined and 349 pieces of the defect maps that the presence of periodic defects has been determined are included.

Meanwhile, among the total defect maps, the remaining 20% (314 pieces) of the defect maps were used for defect maps for test images. The data pairs of the defect maps and the data of the presence/absence of periodic defects assigned to those are used when tests to confirm the correct answer rate of the learned model created using the above-described teacher images are performed. In the 314 pieces of the defect maps used for the defect maps for test images, 221 pieces of the defect maps that the absence of periodic defects has been determined and 93 pieces of defect maps that the presence of periodic defects has been determined are included.

FIG. 10 and FIG. 11 are diagrams illustrating one example of test determination results. FIG. 10 is a determination result when, in the size conversion unit 61, the image sizes of the defect maps of the teacher images and test images are made to be the equal image size of 240×480 pixels. The correct answer rate can be defined as (the number of cases where the absence of periodic defects has been determined as the absence of periodic defects+the number of cases where the presence of periodic defects has been determined as the presence of periodic defects)/(total number of test images), and can be calculated as the correct answer rate=

(209+80)/314=92.0%. Furthermore, the over-detection rate can be defined as (the number of cases where the absence of periodicity has been determined as the presence of periodicity)/(total number of test images), and it can be calculated as over-detection rate=12/314=3.8%.

FIG. 11 is a determination result when, in the size conversion unit 61, the image sizes of the defect maps of the teacher images and test images are made to be the equal image size of 120×240 pixels. The correct answer rate can be calculated as (211+82)/314=93.3%. Furthermore, the over-detection rate can be calculated as 10/314=3.2%.

Referring back to FIG. 3, when the calculated correct answer rate is greater than or equal to the threshold value (Yes at Step S7), the machine learning unit 6 terminates the generation of the learned model. For example, when the threshold value of the correct answer rate is 90%, even when the equal image size illustrated in FIG. 10 is set to 240×480 pixels, or even when the equal image size illustrated in FIG. 11 is set to 120×240 pixels, the condition at Step S7 is satisfied.

Meanwhile, when the calculated correct answer rate was smaller than the threshold value (No at Step S7), the process is returned to Step S2 and Step S5, and the size conversion unit 61 changes the image size of the defect maps of the teacher images and the test images that are set to the equal image size to another equal image size for which the image size is different from the current equal image size. The way of changing the image size is not particularly limited. For example, by setting both image sizes larger than and smaller than the current equal image size as the new equal image size, calculating the correct answer rates for both image sizes, and changing the image size repeatedly in the direction of increasing the correct answer rate, it only needs to detect the image size for which the correct answer rate is greater than or equal to the threshold value. Furthermore, on the display unit 65, the calculated correct answer rate, the information on the teacher images and test images as illustrated in FIG. 10 and FIG. 11, and the like may be displayed, and the user may input the image size to be changed from the information.

In the calculation examples of the correct answer rate illustrated in FIG. 10 and FIG. 11, both the correct answer rate and the over-detection rate in 120×240 pixels are more improved than those in 240×480 pixels having a larger image size. In general, in machine learning, as the image size is larger, the resolution of positional information is increased and the determination becomes more accurate, but because the amount of information is greater, the burden in the calculation is increased. However, in the above-described results, the determination accuracy is better in 120×240 pixels having a smaller image size. It is considered that this is because, if the image size is made too large, it becomes difficult to regard adjacent periodic defects to be consecutive. However, if the image size is made too small, adjacent periodic defects are no longer distinguishable, and thus not preferable. The relation between the image size and the correct answer rate will be described later.

Furthermore, the image size is not limited to 120×240 pixels or 240×480 pixels. When the inventor has tried it, it can be considered that the range of 60 to 600 pixels in the width direction and 120 to 1200 pixels in the length direction of the steel sheet P is an appropriate range of the image size from the balance between the calculation amount and the resolution of the positional information on the defect, but it can be considered that, if the width direction is 60 to 180 pixels and the length direction is 120 to 360 pixels, the calculation time is shortened and is more preferable.

In the above-described example, the example in which the equal image size is changed repeatedly has been described, but the embodiment is not limited thereto. For example, as the equal image size, a plurality of types of the equal image size having different image sizes from one another may be set, the correct answer rate may be calculated for each of the equal image sizes that have been set, and the learned model may be generated in the image size for which the calculated correct answer rate is greater than or equal to a threshold value defined in advance or the highest. For example, as a plurality of types of the equal image size having different image sizes from one another, if it is assumed that 240×480 pixels and 120×240 pixels described with FIG. 10 and FIG. 11 were set, the learned model is created in 120×240 pixels for which the correct answer rate is higher.

For the purpose of comparison with the present invention, the correct answer rate and the over-detection rate in the case where the prior art was used were calculated. As the prior art, a determination method that sets a constant allowable width in the width direction from a defect when the defect is detected and determines defects, which occur periodically within this allowable width, to be periodic defects was used. In the following determination, the allowable width was set to 5 mm. FIG. 12 is a diagram illustrating one example of a test determination result according to the prior art. As illustrated in FIG. 12, the correct answer rate is (844+401)/1544=80.6% and the over-detection rate is 258/1544=16.7%. When this result is compared with the determination result by the learned model, it can be confirmed that, by the learned model, both the correct answer rate and the over-detection rate are significantly improved.

The findings of the relation between the image size and the correct answer rate will be described with reference to FIG. 13 to FIG. 17. In this study, five types of image sizes of 30×60 pixels, 60×120 pixels, 120×240 pixels, 240×480 pixels, and 480×960 pixels were used as the equal image size. For each of the five types of the equal image size, a learned model was created by the above-described learned model generation method and the correct answer rate for each was confirmed. As a result, it has been clarified that the accuracy of determination (that is, correct answer rate) does not become better as the equal image size is larger.

The method of confirming the correct answer rate for each image size is as follows. In this study, for teacher images (data pairs of defect maps for teacher images and data of the presence/absence of periodic defects assigned thereto) and test images (data pairs of defect maps for test images and data of the presence/absence of periodic defects assigned thereto), the total defect maps prepared in FIG. 9 were used. The number of pieces and breakdowns are as illustrated in FIG. 9. That is, the defect maps for teacher images are 1230 pieces, and the defect maps for test images are 314 pieces. Moreover, among the defect maps for teacher images, the defect maps that the absence of periodic defects has been determined are 881 pieces, and the defect maps that the presence of periodic defects has been determined are 349 pieces. Meanwhile, among the defect maps for test images, the defect maps that that the absence of periodic defects has been determined are 221 pieces, and the defect maps that that the presence of periodic defects has been determined are 93 pieces.

Subsequently, using these teacher images, for each equal image size, a learned model was created by the above-described learned model generation method. Then, for the learned model created for each equal image size, using the test images of the equal image size, the presence/absence of periodic defects was estimated. In the learning process by teacher images and the estimation process of test images, a loss function and the correct answer rate when the number of epochs was changed up to 100 were also calculated.

Figure 13:
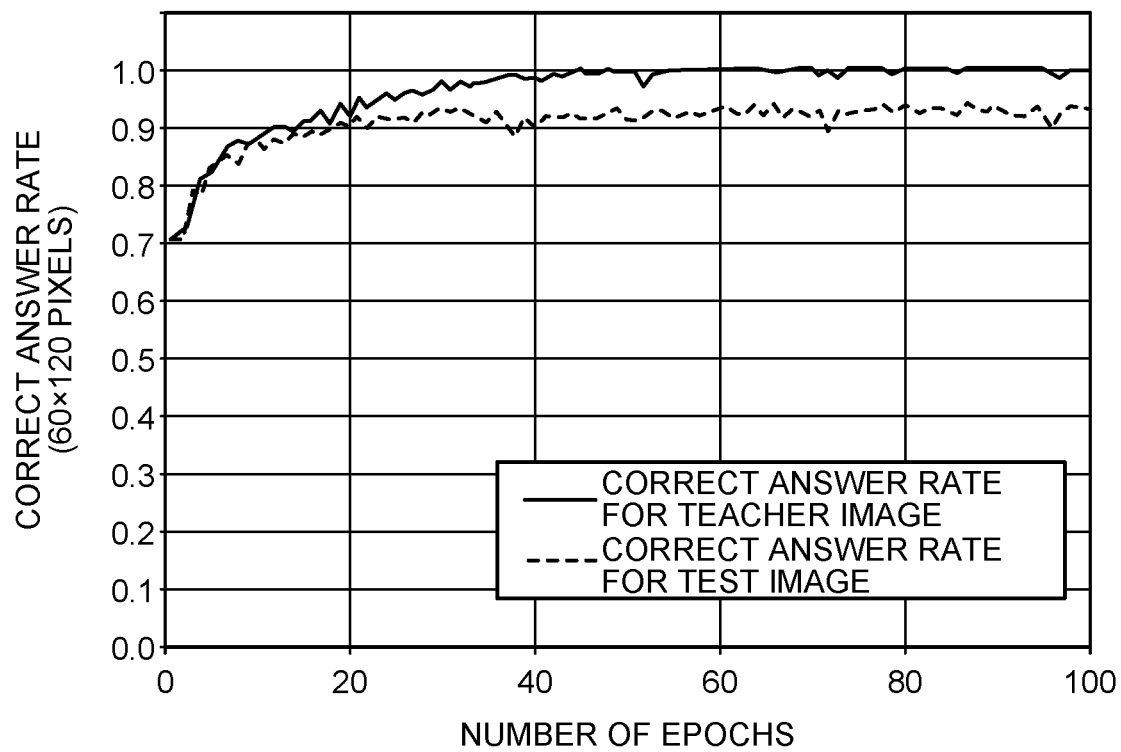
FIG. 13 is a graph illustrating changes in the correct answer rate for the teacher image and the test image when the equal image size is set to 60×120 pixels.
Figure 14:
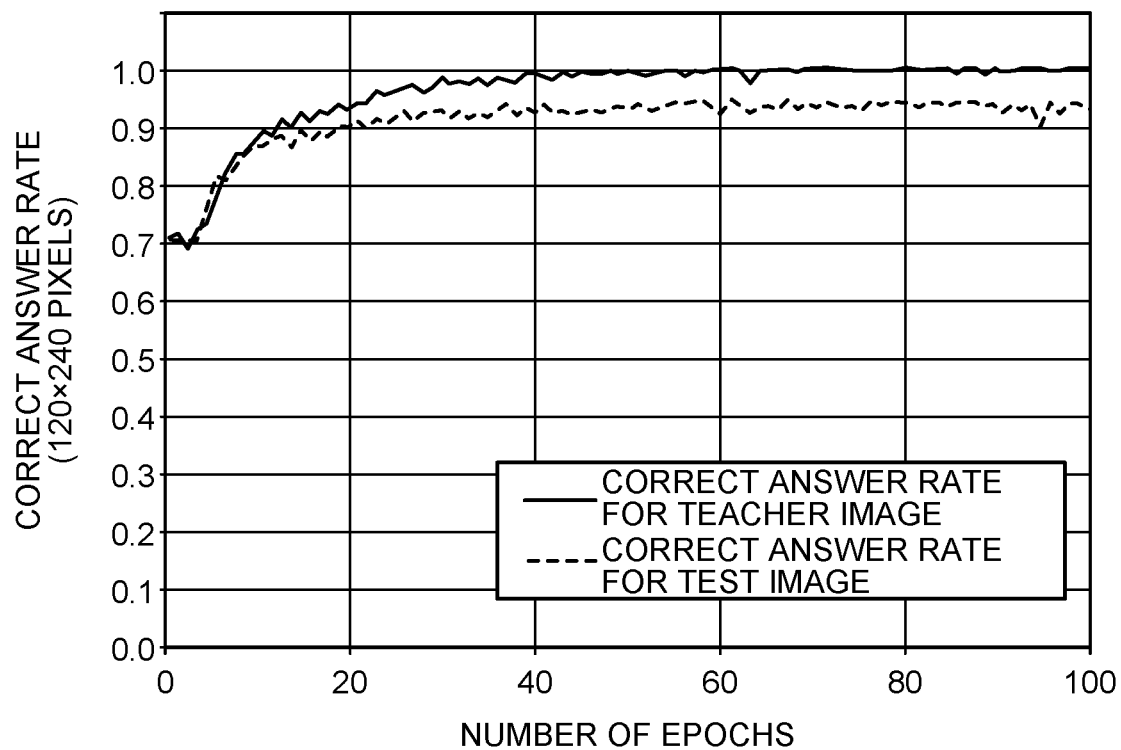
FIG. 14 is a graph illustrating changes in the correct answer rate for the teacher image and the test image when the equal image size is set to 120×240 pixels.
Figure 15:
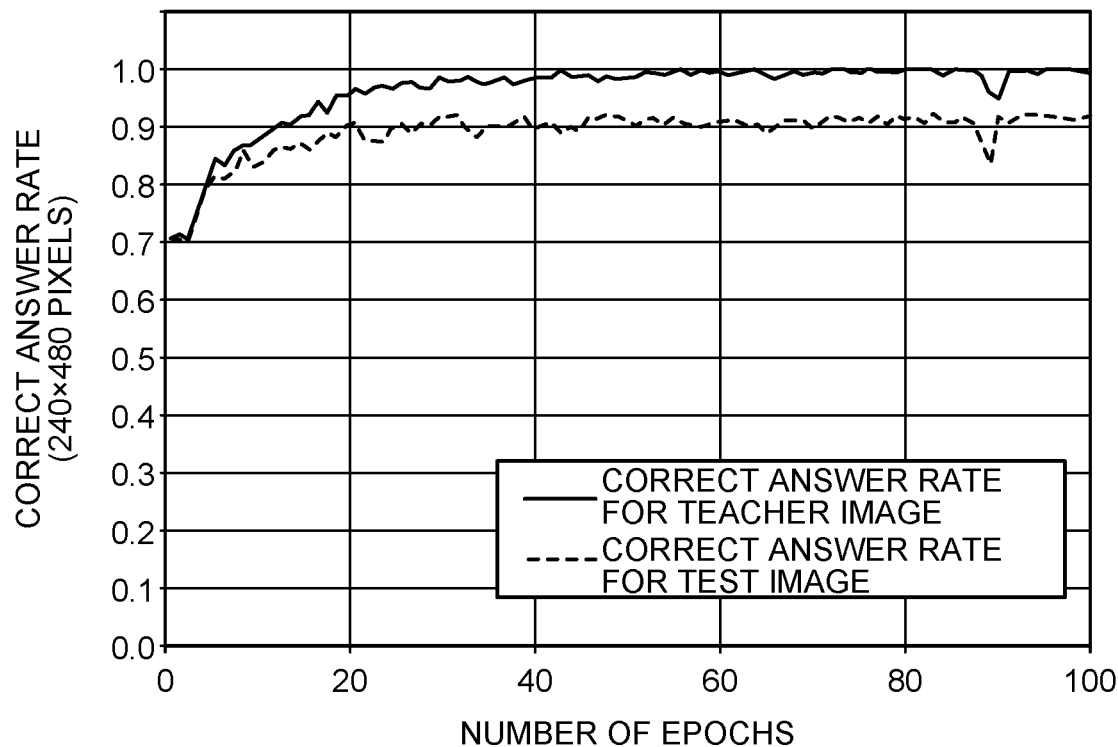
FIG. 15 is a graph illustrating changes in the correct answer rate for the teacher image and the test image when the equal image size is set to 240×480 pixels.

FIG. 13 to FIG. 15 are graphs illustrating examples of the correct answer rate when the equal image size is set to 60×120 pixels, 120×240 pixels, and 240×480 pixels, respectively. In FIG. 13 to FIG. 15, the ordinate axis represents the correct answer rate, and the abscissa axis represents the number of epochs. A broken line in the graph is the correct answer rate for the test images. For reference, by a solid line in the same graph, the correct answer rate for the teacher images is also indicated.

Figure 16:
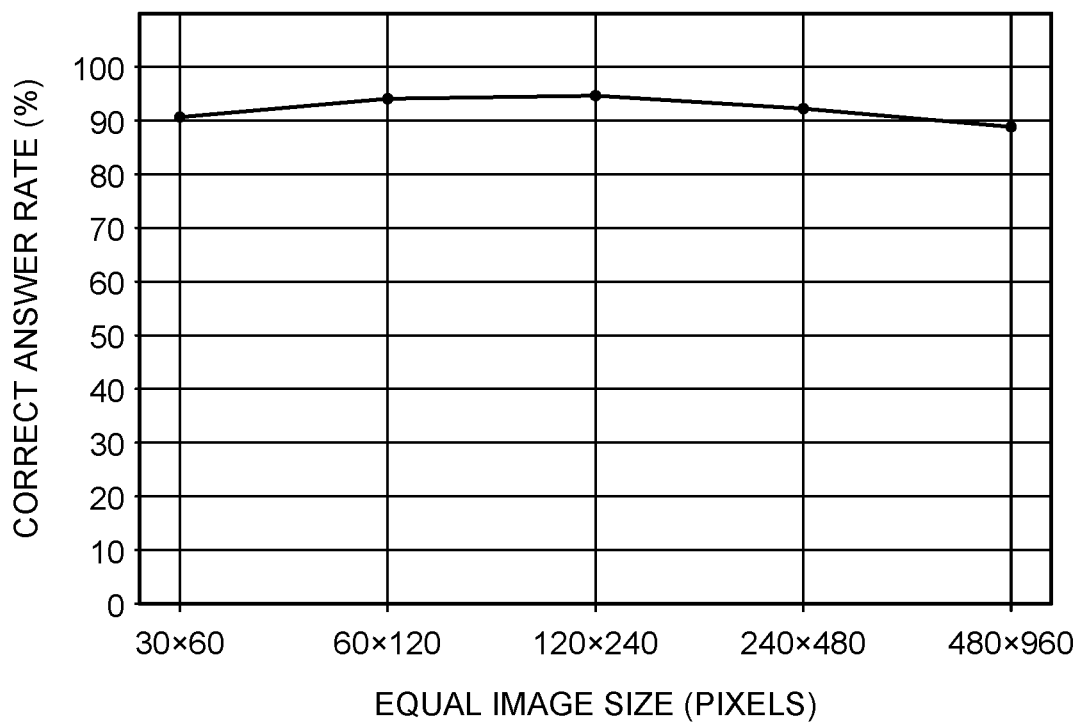
FIG. 16 is a graph plotting the relation, in FIG. 13 to FIG. 15, between the highest correct answer rate for the test image and the equal image size.
Figures 17, 18:
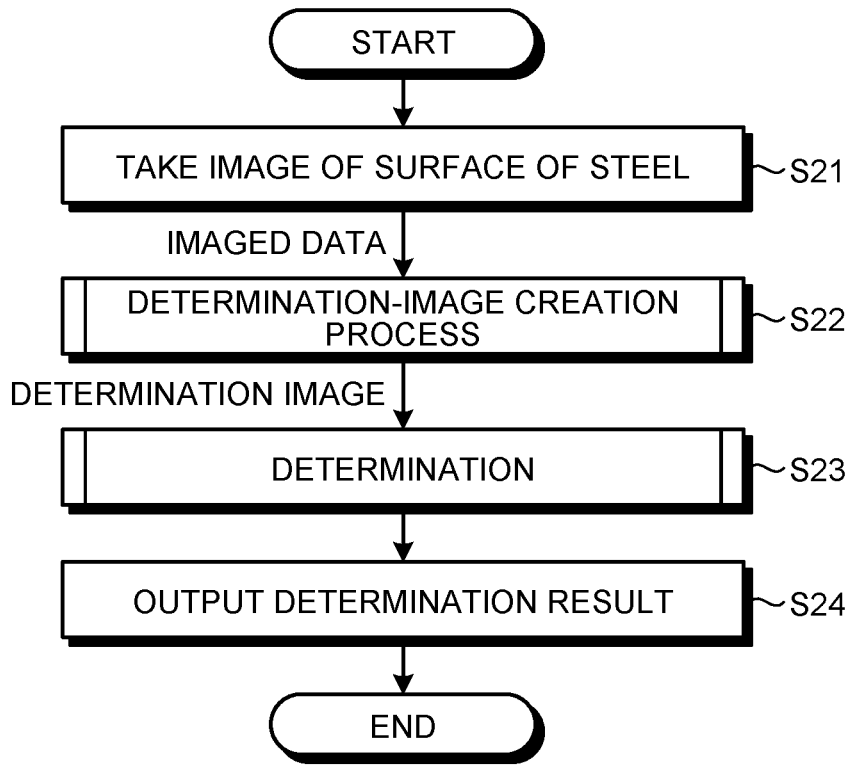
FIG. 17 is a table illustrating the value of the correct answer rate at the plot point in FIG. 16 and the number of epochs at the time of the highest correct answer rate.
FIG. 18 is a flowchart illustrating a flow of determining the presence/absence of periodic defects on steel material.

Among the calculated correct answer rates for the test images, the highest value for each equal image size was defined as the correct answer rate for the relevant equal image size. FIG. 16 is a graph in which the correct answer rates obtained by the above-described method were plotted with the equal image size on the abscissa axis. FIG. 17 indicates the correct answer rates obtained by the above-described method with numerical values. The number of epochs indicated together in FIG. 17 indicates the number of epochs at the time of the highest correct answer rate of the test image. As illustrated in FIG. 16 and FIG. 17, among the five types of the equal image sizes, the correct answer rate when the equal image size was set to 120×240 pixels was the highest. That is, it can be found that the accuracy of determination (that is, correct answer rate) does not become better as the equal image size is larger. Thus, when generating a learned model or when using a learned model, it is technically preferable that, rather than simply increasing the image size of the image to be the input value, the image size for which the correct answer rate is expected to be within the allowable range be selected and used as the equal image size. Furthermore, it is highly preferable that, among the image sizes for which the correct answer rate is expected to be within the allowable range, the image size of a higher correct answer rate be selected and used.

According to the above-described learned model generation method, because the learned model subjected to machine learning is generated after changing the image size so that the defect maps for teacher images and test images are the equal image size, the learned model (or a classifier, or if further limited, a convolutional neural network system) of a high correct answer rate can be obtained. Moreover, because the learned model subjected to machine learning is generated after adjusting the generation conditions of the learned model so that the correct answer rate is greater than or equal to the threshold value, the learned model of a higher correct answer rate can be obtained. As a specific method of adjusting the generation conditions of the learned model, a known method such as increasing the number of intermediate layers of the neural network (in the first embodiment, CNN), changing the combination of intermediate layers, relearning by further increasing the teacher images, and the like can be used. As a unique method of the present invention, the method of converting the equal image size of the defect maps for teacher images and test images into another equal image size can be used. In addition, by using this learned model to determine the defect maps, even if the periodic defects on the surface of the steel greatly meander, the detection can be made automatically with high accuracy regardless of human power.

Surface Defect Inspection Method for Steel

Next, with reference to FIG. 18 to FIG. 22, a surface defect inspection method for steel using the created learned model will be described in detail.

FIG. 18 is a flowchart illustrating the flow of determining the presence/absence of periodic defects of steel material. As illustrated in FIG. 18, first, the surface of the steel sheet P is irradiated with illumination light from the lighting device 2, and the imaging device 3 images the surface of the steel sheet P that is irradiated with the illumination light (Step S21). The imaged data that is electronic data imaged by the imaging device 3 is output to the image processing unit 4.

Then, the image processing unit 4 performs a determination-image creation process of generating a determination image (Step S22). The determination image is an image to be an object of being determined for the presence/absence of periodic defects by the learned model.

Figure 19:
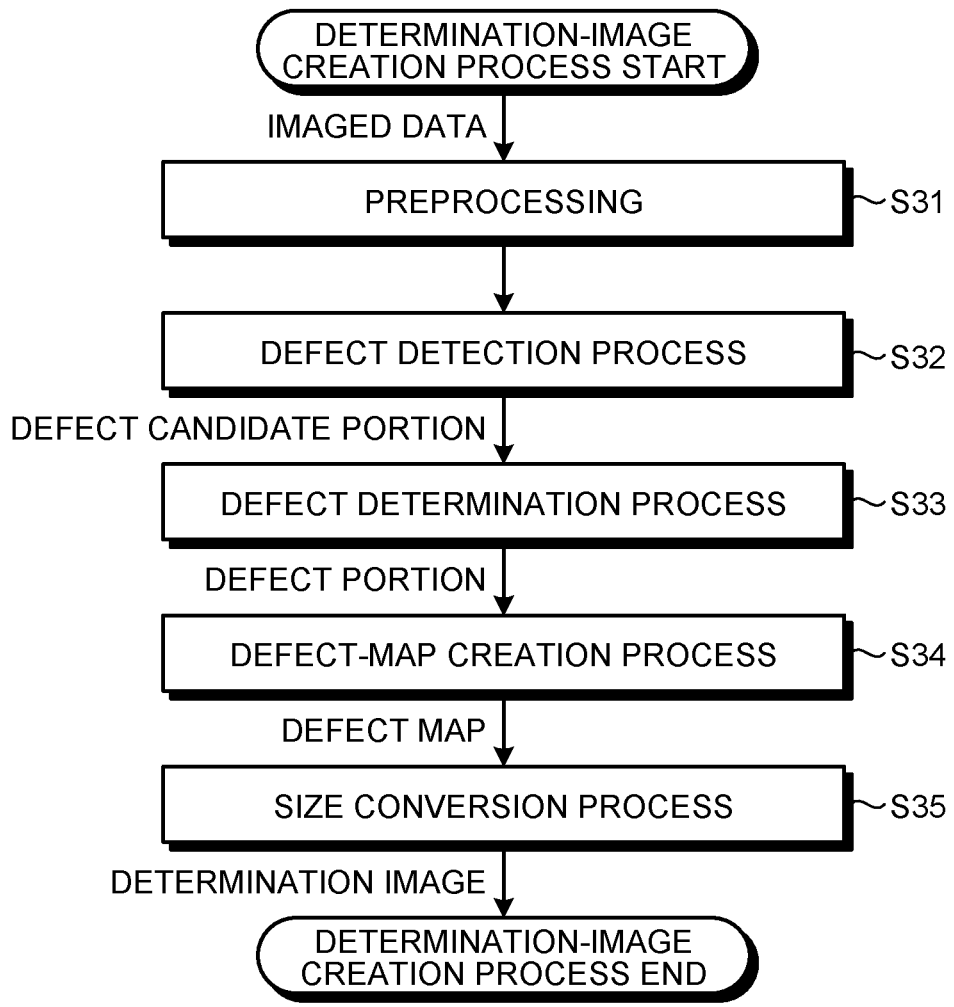
FIG. 19 is a flowchart illustrating a determination-image creation process in FIG. 18.

FIG. 19 is a flowchart illustrating the determination-image creation process in FIG. 18. As illustrated in FIG. 19, the image processing unit 4 performs preprocessing on the imaged data that the imaging device 3 output (Step S31). The data acquisition unit 41 connects to the imaging device 3 so as to allow the image processing unit 4 to take in the image that the imaging device 3 imaged as electronic data. First, the data acquisition unit 41 has therein a temporary storage area and buffers the imaged data of the surface of the steel sheet P transmitted from the imaging device 3 into the temporary storage area in sequence. Then, the data acquisition unit 41 outputs, when the imaging device 3 is an area sensor or a CCD and the imaged data is a two-dimensional image of a certain size, two-dimensional image data to the image correction unit 42. Furthermore, the data acquisition unit 41 outputs to the image correction unit 42, when the imaging device 3 is a line sensor and the imaged data is one-dimensional data, two-dimensional image data for which the imaged data of a predetermined length are combined. The image correction unit 42 performs, on the two-dimensional image data that the data acquisition unit 41 output, image correction such as edge detection, uneven brightness correction (shading correction), brightness adjustment, and the like.

Subsequently, the defect detection unit 43 performs a defect detection process of extracting, by using a threshold value predetermined based on the material, type, and the like of the steel sheet P, a point for which a brightness value is greater than or equal to the threshold value in each two-dimensional image data as a defect candidate portion, and calculating the feature quantities such as the width, length, and position thereof, a maximum value and minimum value of brightness, average brightness, and the like (Step S32).

Thereafter, the defect determination unit 44 performs a defect determination process of determining, based on the feature quantities for each defect candidate portion calculated at Step S32, the harmfulness/harmlessness determination, size, defect type, severity, and the like (Step S33). In the following description, among the defect candidate portions, the defect candidate portion that the defect determination unit 44 determined to be harmful is referred to as a defect portion. The data of the defect portion includes at least the defect type, severity, size, and coordinates.

Moreover, the defect-map creation unit 45 creates, from the defect portion data that the defect determination unit 44 determined, a defect map indicating the two-dimensional distribution of the defect portion (Step S34).

Thereafter, a single or a plurality of defect maps that are objects of determination are transmitted to the steel determination unit 5. Then, the size conversion unit 51 of the steel determination unit 5 performs a size conversion process of converting the image size of each defect map into the equal image size as that of the teacher images (Step S35). Specifically, when the image size of the defect map to be an object of determination is larger than the equal image size set in advance, the size conversion unit 51 makes the image size small to be the same as that of the equal image size. Conversely, when the image size of the defect map to be an object of determination is smaller than the equal image size set in advance, the image size is made large to be the same as that of the equal image size. The equal image size as the teacher image is the image size of the defect map when creating a learned model and is set in advance from the image size of the defect map of the teacher image. In other words, at Step S35, the equal image size of the defect maps of the teacher image and the test image, which was selected when creating the learned model to be used, is also used for the defect map of the determination image.

By the above-described processing, the determination image that is a defect map of the equal image size as those of the teacher image and the test image is created. The determination image is an image to be an object of determining the presence/absence of periodic defects, and thus, the presence/absence of a periodicity result is unknown (undetermined) at this point. Then, by the subsequent processing, the presence/absence of the periodicity in the determination image is determined by the learned model.

The size conversion unit 51 of the steel determination unit 5 has the same function as that of the size conversion unit 61 at the above-described Step S2 and Step S4, but has a different role. The size conversion unit 51 at Step S35 plays a role in fixing and unifying the defect maps having different image sizes into the equal image size set in advance. In the case of the foregoing size conversion unit 61, the role is to change, in order to increase the correct answer rate of the learned model, the teacher image and the test image that are fixed to a specific equal image size into another equal image size.

Referring back to FIG. 18, the steel determination unit 5 performs determination on the determination image (Step S23). The determination is a process that the steel determination unit 5 performs, and in this case, is the process of determining the presence/absence of periodic defects and the like of the steel sheet P.

Figure 20:
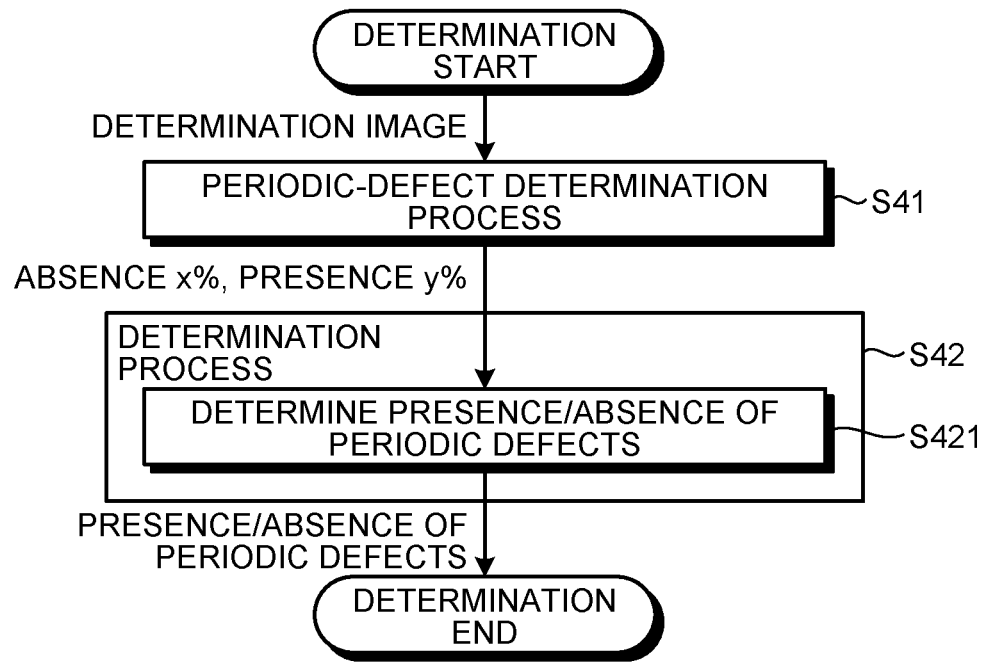
FIG. 20 is a flowchart illustrating the determination in FIG. 18.

FIG. 20 is a flowchart illustrating the determination step S23 of FIG. 18. In FIG. 20, the periodic-defect determination unit 52 performs a periodic-defect determination process of determining whether the determination image is an image having periodic defects (Step S41). Specifically, the periodic-defect determination unit 52 inputs the determination image into the learned model and outputs the value concerning the presence/absence of periodic defects. The value concerning the presence/absence of periodic defects includes a probability x % of the determination image being an image from which periodic defects are absent and a probability y % of the determination image being an image in which periodic defects being present.

Subsequently, the determination unit 53 performs a determination process of making the determination on the determination image (Step S42). The determination process is a process that the determination unit 53 performs, and in this case, is the process that the determination unit 53 determines whether the determination image is an image having periodic defects. Specifically, the determination unit 53 determines, based on the probability x calculated by the periodic-defect determination unit 52, whether the determination image is an image having no periodic defects (Step S421). The determination unit 53 determines that, when the probability x % of the determination image being an image from which periodic defects are absent calculated by the periodic-defect determination unit 52 is greater than or equal to a threshold value, the determination image is an image from which periodic defects are absent, and when the probability x % is smaller than the threshold value, determines that the determination image is an image in which periodic defects are present. The determination unit 53 may determine whether the determination image is an image from which periodic defects are absent, using the probability y calculated by the periodic-defect determination unit 52 or both the probability x and the probability y.

Referring back to FIG. 18, the steel determination unit 5 outputs a determination result by displaying the determination result on the display unit 55 or by storing the determination result into the storage device (Step S24), for example, and terminates the series of processes.

According to the above-described surface defect inspection method for steel, by using a learned model (or a classifier, or if further limited, a convolutional neural network system), even when the steel sheet P is meandering, the presence/absence of periodic defects can be automatically detected with high accuracy regardless of human visual observation.

Next, a comparison result between the prior art and the surface defect inspection method for steel of the present invention will be described. FIG. 21 is a diagram illustrating one example of defect maps that include periodic defects. FIG. 21(*a*) to FIG. 21(*c*) are defect maps that include periodic defects and were determined to include periodic defects by both the surface defect inspection method for steel and the prior art.

FIG. 22 is a diagram illustrating one example of defect maps that do not include periodic defects. FIG. 22(*a*) and FIG. 22(*b*) are both defect maps that do not include periodic defects and were determined to include no periodic defects by the surface defect inspection method for steel and determined to include periodic defects by the prior art. That is, it was possible to demonstrate that the surface defect inspection method for steel was able to detect the periodic defects that the prior art was not.

Note that, by detecting periodic defects on the surface of steel by using the above-described surface defect inspection method for steel, and by controlling the manufacturing conditions according to the detection result, a steel manufacturing method of manufacturing the steel may be made. As the methods for manufacturing steel other than the surface defect inspection method, a known method or an existing method can be used. As the control of manufacturing conditions, rolling rolls and transport rolls that can be considered to be the cause of periodic defects are washed or replaced, for example. As a result, periodic defects can be found promptly, and the quality of the manufactured steel can be prevented from deteriorating. When manufacturing a steel sheet among steel, particularly a steel strip that is a long steel sheet, the effect of preventing a significant loss of product quality due to periodic defects, which tend to occur over an extended range, is remarkable.

Pass/Fail Determination Method for Steel

Figure 23:
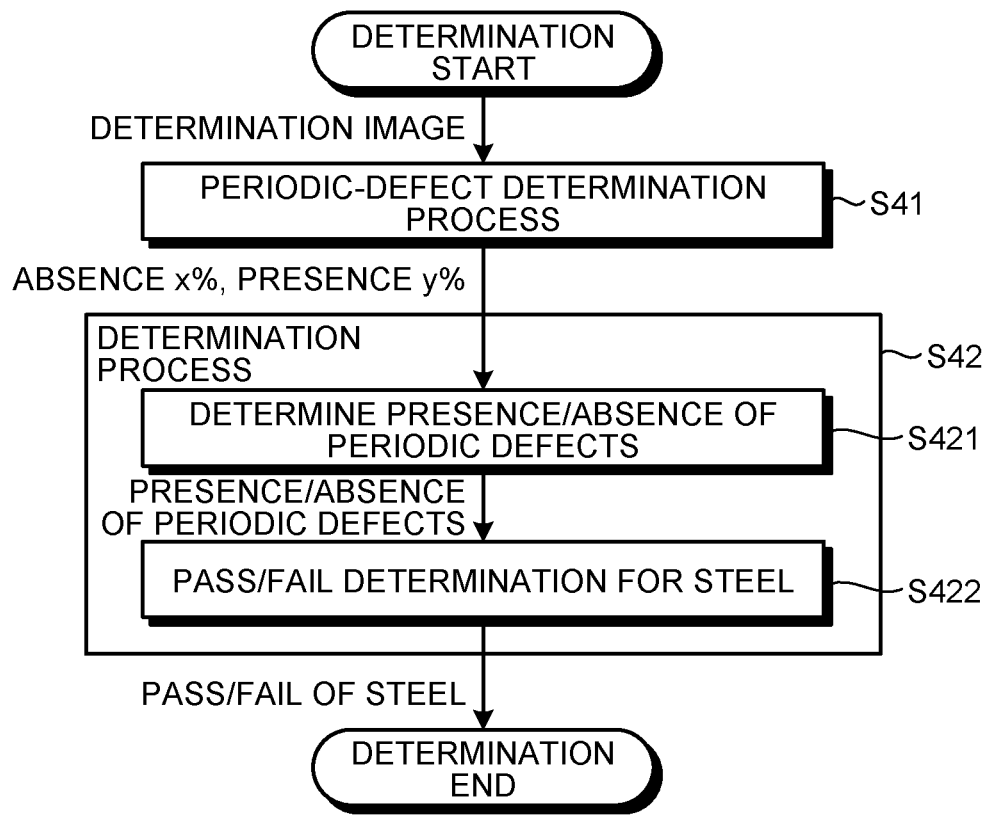
FIG. 23 is a flowchart illustrating the determination in FIG. 18.

Next, with reference to FIG. 23, a pass/fail determination method for steel using the created learned model will be described in detail. In the pass/fail determination method for the steel sheet P, in place of Step S42 illustrated in FIG. 20, a process of S42 illustrated in FIG. 23 is performed. The processes of Step S21, Step S22, and Step S24 are the same processes as the above-described processes, and thus the description thereof will be omitted.

FIG. 23 is a flowchart illustrating the determination step S23 of FIG. 18. As illustrated in FIG. 23, the processes of Step S41 and Step S421 are the same processes as the above-described processes, and thus the description thereof will be omitted. At Step S42, the determination unit 53 determines whether the steel sheet P corresponding to the determination image is a pass (Step S422). The determination unit 53 determines that, when a determination image is determined to be an image from which periodic defects are absent, the steel sheet P corresponding to the determination image is a pass, and determines that, when a determination image is determined to be an image in which periodic defects are present, the steel sheet P corresponding to the determination image is a fail.

Note that, by determining a pass/fail of the steel by using the above-described pass/fail determination method for steel, and by controlling the manufacturing conditions according to the determination result, a steel manufacturing method of manufacturing the steel may be made. As the methods for manufacturing steel other than the pass/fail determination method, a known method or an existing method can be used. As the control of manufacturing conditions, rolling rolls and transport rolls that can be considered to be the cause of the determination being a fail are washed or replaced, for example. As a result, the steel for which the determination is a fail due to having periodic defects can be found promptly and the quality of the manufactured steel can be prevented from deteriorating. When manufacturing a steel sheet among steel, particularly a steel strip that is a long steel sheet, the effect of preventing a significant loss of product quality due to periodic defects, which tend to occur over an extended range, is remarkable.

First Modification of Pass/Fail Determination Method for Steel

Figure 24:
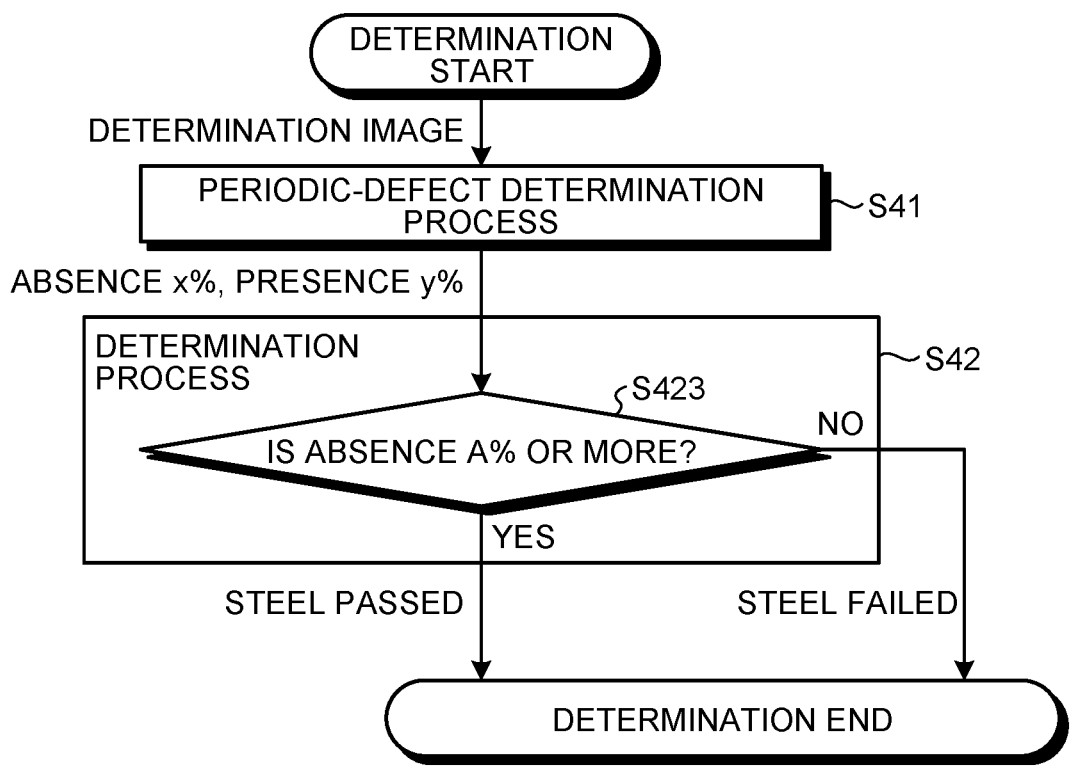
FIG. 24 is a flowchart illustrating the determination in FIG. 18.

FIG. 24 is a flowchart illustrating the determination step S23 of FIG. 18. As illustrated in FIG. 24, the process at Step S41 is the same process as the above-described process, and thus the description thereof will be omitted. At Step S42, the determination unit 53 determines, based on the probability x and the probability y calculated by the periodic-defect determination unit 52, whether the steel sheet P corresponding to the determination image is a pass (Step S423). The determination unit 53 determines that, when the probability x % of the determination image being an image from which periodic defects are absent calculated by the periodic-defect determination unit 52 is greater than or equal to A % (Yes at Step S423), the steel sheet P corresponding to the relevant determination image is a pass, and when the probability x % is smaller than A % (No at Step S423), the steel sheet P corresponding to the relevant determination image is a fail. As described, without performing the determination of whether the determination image is an image from which periodic defects are absent, the pass/fail of the steel sheet P may be determined directly.

Second Embodiment

Figure 25:
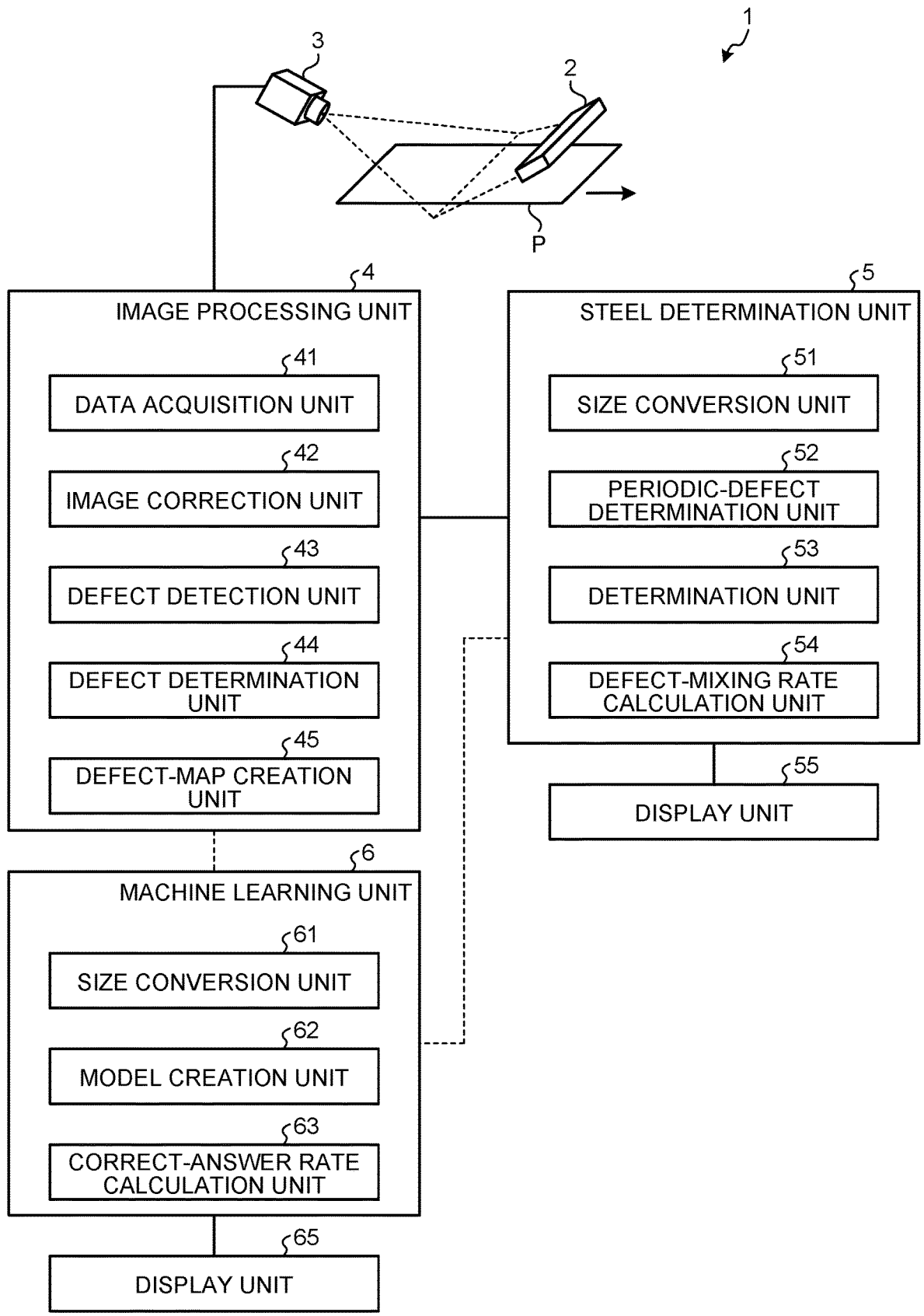
FIG. 25 is a schematic diagram illustrating a configuration of a steel determination system according to a second embodiment of the present invention.

FIG. 25 is a schematic diagram illustrating a configuration of a steel determination system according to a second embodiment of the present invention. As illustrated in FIG. 25, in the steel determination system 1 in the second embodiment, the steel determination unit 5 includes a defect-mixing rate calculation unit 54. The lighting device 2, the imaging device 3, the image processing unit 4, the steel determination unit 5, the machine learning unit 6, the data acquisition unit 41, the image correction unit 42, the defect detection unit 43, the defect determination unit 44, the defect-map creation unit 45, the size conversion units 51 and 61, the periodic-defect determination unit 52, the determination unit 53, the display units 55 and 65, the model creation unit 62, and the correct-answer rate calculation unit 63 are the same as those described in the first embodiment, and thus the description thereof will be omitted.

Second Modification of Pass/Fail Determination Method for Steel

Figure 26:
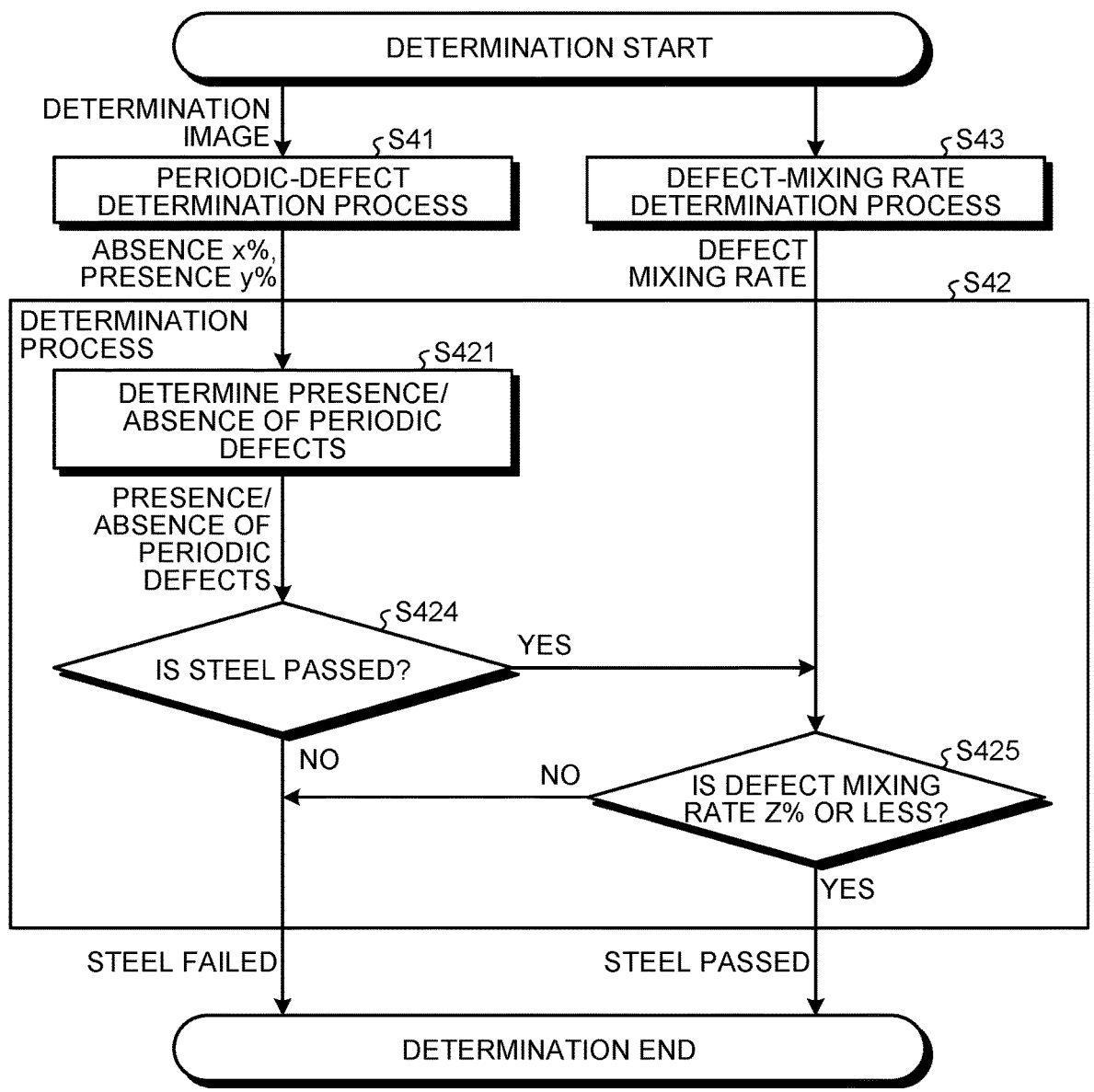
FIG. 26 is a flowchart illustrating the determination in FIG. 18.

FIG. 26 is a flowchart illustrating the determination step S23 of FIG. 18. As illustrated in FIG. 26, the processes of Step S41 and Step S421 are the same processes as the above-described processes, and thus the description thereof will be omitted. Furthermore, in the first process in FIG. 26, there are two arrows, and this indicates that the processing at Step S41 and the processing at Step S43 may be performed in parallel.

At Step S43, the defect-mixing rate calculation unit 54 performs a defect-mixing rate determination process of calculating a defect mixing rate. The defect mixing rate is a value calculated based on the number of defect portions per unit area in the defect map.

At Step S424, when the determination unit 53 determined that the steel sheet P corresponding to the determination image is a pass (Yes at Step S424), the determination unit 53 determines whether the defect mixing rate of the defect map corresponding to the relevant determination image is less than or equal to Z % (Step S425). When the determination unit 53 determined that the defect mixing rate is less than or equal to Z % (Yes at Step S425), the determination unit 53 determines that the steel sheet P corresponding to the relevant determination image is a pass.

Meanwhile, when the determination unit 53 determined that the defect mixing rate is greater than Z % (No at Step S425), the determination unit 53 determines that the steel sheet P corresponding to the relevant determination image is a fail.

Third Modification of Pass/Fail Determination Method for Steel

As a third modification, in place of Step S421 and Step S424 of FIG. 26, Step S423 of FIG. 24 may be used. That is, at Step S423, the determination unit 53 advances the determination image for which the probability x % of being an image from which periodic defects are absent is greater than or equal to A % was determined (Yes at Step S423) to Step S425, and determines the steel sheet P corresponding to the determination image for which the probability x % is smaller than A % was determined (No at Step S423) to be a fail. In this case, as the processing for one step is reduced, it can be expected to perform the processing more promptly.

Note that, by determining a pass/fail of the steel by using the above-described pass/fail determination method for steel, and by controlling the manufacturing conditions according to the determination result, a steel manufacturing method of manufacturing the steel may be made. As the methods for manufacturing steel other than the pass/fail determination method, a known method or an existing method can be used. As the control of manufacturing conditions, rolling rolls and transport rolls that can be considered to be the cause of the determination being a fail are washed or replaced, for example. As a result, the steel for which the determination is a fail due to having periodic defects can be found promptly and the quality of the manufactured steel can be prevented from deteriorating. When the above-described first to the third modifications are used, it can be determined, in addition, whether there is a need to immediately perform the washing or replacing of rolling rolls and transport rolls. As a result, more efficient control, for example, immediate suppression of the occurrence of unacceptable defects, is possible. When manufacturing a steel sheet among steel, particularly a steel strip that is a long steel sheet, the effect of preventing a significant loss of product quality due to periodic defects, which tend to occur over an extended range, is remarkable.

According to the above-described pass/fail determination method for steel, the pass/fail of the steel sheet P can be determined based not only on the presence/absence of periodic defects but also on the mixing rate of periodic defects.

Grade Determination Method for Steel

Figure 27:
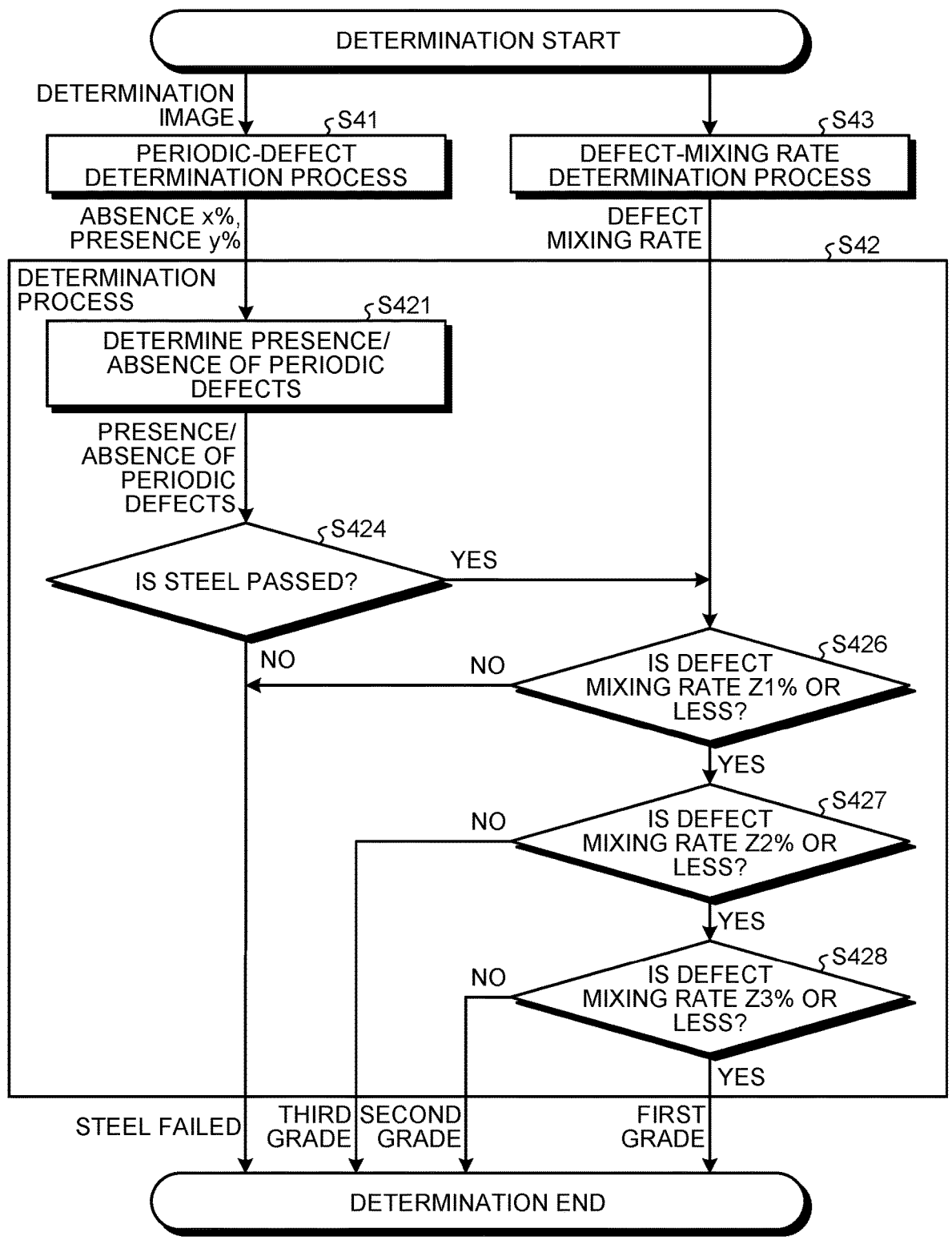
FIG. 27 is a flowchart illustrating the determination in FIG. 18.

Next, with reference to FIG. 27, a grade determination method for steel using the created learned model will be described in detail. In the grade determination method for the steel sheet P, in place of Step S42 illustrated in FIG. 26, a process of S42 illustrated in FIG. 27 is performed. The processes of Step S21, Step S22, and Step S24 are the same processes as the above-described processes, and thus the description thereof will be omitted.

FIG. 27 is a flowchart illustrating the determination step S23 of FIG. 18. As illustrated in FIG. 27, the processes of Step S41, Step S43, and Step S421 are the same processes as the above-described processes, and thus the description thereof will be omitted.

At Step S424, when the determination unit 53 determines that the steel sheet P corresponding to the determination image is a pass (Yes at Step S424), the determination unit 53 determines whether the defect mixing rate of the defect map corresponding to the relevant determination image is less than or equal to Z1% (Step S426). When the determination unit 53 determines that the defect mixing rate is less than or equal to Z1% (Yes at Step S426), the determination unit 53 determines whether the defect mixing rate of the defect map corresponding to the relevant determination image is less than or equal to Z2% (Step S427). When the determination unit 53 determines that the defect mixing rate is less than or equal to Z2% (Yes at Step S427), the determination unit 53 determines whether the defect mixing rate of the defect map corresponding to the relevant determination image is less than or equal to Z3% (Step S428). When the determination unit 53 determined that the defect mixing rate is less than or equal to Z3% (Yes at Step S428), the determination unit 53 determines that the grade of the steel sheet P corresponding to the relevant determination image is first grade.

At Step S428, when the determination unit 53 determined that the defect mixing rate is greater than Z3% (No at Step S428), the determination unit 53 determines that the grade of the steel sheet P corresponding to the relevant determination image is second grade.

At Step S427, when the determination unit 53 determined that the defect mixing rate is greater than Z2% (No at Step S427), the determination unit 53 determines that the grade of the steel sheet P corresponding to the relevant determination image is third grade.

At Step S426, when the determination unit 53 determined that the defect mixing rate is greater than Z1% (No at Step S426), the determination unit 53 determines that the steel sheet P corresponding to the relevant determination image is a fail.

According to the above-described grade determination method for steel, the steel sheet P having periodic defects can be failed, and also the steel sheet P having no periodic defects can be classified based on the defect mixing rate. Even in this case, because the learned model (or a classifier, or if further limited, a convolutional neural network system) is used, even when the steel sheet P is meandering, by determining the presence/absence of periodic defects with high accuracy, the grade of the steel sheet P can be determined.

In the above-described grade determination method for steel, the pass/fail of the steel sheet P was determined at Step S422 after Step S421, but the embodiment is not limited thereto. After Step S421, the determination unit 53 may determine the presence/absence of periodic defects for the determination image at Step S424, perform the classifying of the grades of the steel sheet P at Step S426 to Step S428 together once when the absence of periodic defects is determined, and determine the steel sheet P to be a fail when the presence of periodic defects is determined.

Furthermore, in the above-described grade determination method for steel, the processing in which the determination unit 53 performs in sequence the processes of Step S424, Step S426, Step S427, and Step S428 has been described, but the embodiment is not limited thereto. The determination unit 53 may have a table that outputs the pass/fail and the grade of the steel sheet P upon inputting the presence/absence of periodic defects and the defect mixing rate. In this case, when the presence/absence of periodic defects and the defect mixing rate are input to the determination unit 53, the determination unit 53 outputs the determination of the first grade when the steel sheet P passes and the defect mixing rate is less than or equal to Z3, the second grade when the steel sheet P passes and the defect mixing rate is greater than Z3 but less than or equal to Z2, the third grade when the steel sheet P passes and the defect mixing rate is greater than Z2 but less than or equal to Z1, and a fail when the steel sheet P fails or the defect mixing rate is greater than Z1.

As a modification, in place of Step S421 and Step S424 of FIG. 27, Step S423 of FIG. 24 may be used. That is, at Step S423, the determination unit 53 advances the determination image determined that the probability x % of being an image from which periodic defects are absent is greater than or equal to A % (Yes at Step S423) to Step S426, and determines the steel sheet P corresponding to the determination image determined that the probability x % is smaller than A % (No at Step S423) to be a fail. In this case, as the processing for one step is reduced, it can be expected to perform the processing more promptly.

The steel manufacturing method can include a sorting step of determining the grade of the steel using the above-described grade determination for steel and, by using its determination result, sorting the steel for each grade. As the methods for manufacturing steel other than the grade determination method, a known method or an existing method can be used. In this case, the steel can be sorted by grade. As a result, the steel of the same type but different grades can be shipped to appropriate destinations. Even in this case, if the failed steel exceeds the desired amount, the manufacturing conditions may be controlled. As the control of manufacturing conditions, rolling rolls and transport rolls that can be considered to be the cause of the determination being a fail are washed or replaced, for example. As a result, the steel for which the determination is a fail due to having periodic defects can be found promptly and the quality of the manufactured steel can be prevented from deteriorating. When manufacturing a steel sheet among steel, particularly a steel strip that is a long steel sheet, the effect of preventing a significant loss of product quality due to periodic defects, which tend to occur over an extended range, is remarkable.

The steel manufacturing equipment can include the above-described steel determination system. As the steel manufacturing equipment other than the steel determination system, known equipment or existing equipment can be used. As a result, the steel having periodic defects can be found promptly and the quality of the manufactured steel can be prevented from deteriorating. The above-described steel determination system is more effective when installed in manufacturing equipment provided with at least one roll or more. This is because, in addition to the above-described effect, the timing of washing or replacing rolling rolls and transport rolls that can be considered to be the cause of periodic defects in the steel is also easier to be determined based on the amount of the steel having periodic defects. Among the steel manufacturing equipment, in the case of the manufacturing equipment for a steel sheet, particularly the equipment for manufacturing a steel strip that is a long steel sheet, a particularly high effect can be obtained. This is because, in addition to the above-described effect, the effect of preventing a significant loss of product quality due to periodic defects, which tend to occur over an extended range, is remarkable.

As in the foregoing, the embodiments to which the invention made by the inventors was applied have been described, but the present invention is not limited by the description and the drawings constituting a part of the disclosure of the invention according to the embodiments. That is, other embodiments, examples, operational techniques, and the like made by those skilled in the art based on the present embodiments are all included in the scope of the present invention.

REFERENCE SIGNS LIST

1 STEEL DETERMINATION SYSTEM
2 LIGHTING DEVICE
3 IMAGING DEVICE
4 IMAGE PROCESSING UNIT
5 STEEL DETERMINATION UNIT
6 MACHINE LEARNING UNIT
41 DATA ACQUISITION UNIT
42 IMAGE CORRECTION UNIT
43 DEFECT DETECTION UNIT
44 DEFECT DETERMINATION UNIT
45 DEFECT-MAP CREATION UNIT
51, 61 SIZE CONVERSION UNIT
52 PERIODIC-DEFECT DETERMINATION UNIT
53 DETERMINATION UNIT
54 DEFECT-MIXING RATE CALCULATION UNIT
55, 65 DISPLAY UNIT
62 MODEL CREATION UNIT
63 CORRECT-ANSWER RATE CALCULATION UNIT
71 INPUT LAYER
72 INTERMEDIATE LAYER
73 OUTPUT LAYER
D PERIODIC DEFECT
P STEEL SHEET

The invention claimed is:

1. A method comprising:
acquiring imaged data for which a surface of steel has been captured;
creating a defect map that is an image indicating a distribution of a defect portion based on the imaged data;
creating a determination image for each defect map by converting an image size of the defect map into a predetermined image size; and
inputting the determination image into a learned model, outputting a value concerning presence/absence of periodic defects, and determining the presence/absence of periodic defects for the determination image based on the value concerning the presence/absence of periodic defects, wherein
the learned model is trained using
a teacher image as an input, the teacher image (i) having the predetermined image size and (ii) being a defect map indicating a distribution of defect portions on the surface of the steel, and
a value concerning presence or absence of periodic defects in the teacher image as an output, and
the predetermined image size has a correct answer rate associated with the learned model that falls within an allowable range.

2. A steel manufacturing method comprising:
detecting periodic defects on a surface of a steel using the method according to claim 1; and
manufacturing steel by controlling a manufacturing condition based on the detection result.

3. The method according to claim 1, further comprising:
calculating a defect mixing rate of the determination image based on the defect portion; and
determining a grade of the steel corresponding to the determination image, based on the calculated defect mixing rate and a determination result of the presence/absence of periodic defects for the determination image.

4. The method according to claim 3, further including a steel manufacturing sorting step of sorting steel for each grade.

5. The method according to claim 1,
when an image size of the defect map used as the teacher image is different from the predetermined image size, the image size of the defect map is converted into the predetermined image size to use the defect map as the input value.

6. The method according to claim 5, wherein the learned model is being generated by using a test image including a defect map indicating a distribution of a defect portion of a surface of steel and having the equal image size as the teacher image, and presence/absence of periodic defects in the defect map, wherein generating the learned model by using the test image includes:
inputting the defect map of the test image into the learned model to output a value concerning presence/absence of periodic defects in the test image;
determining the presence/absence of periodic defects in the test image based on the value concerning the presence/absence of periodic defects;
calculating a correct answer rate for the test image by comparing the determined presence/absence of periodic defects with the presence/absence of periodic defects in the defect map of the test image; and
adjusting a generation condition of the learned model according to the calculated correct answer rate.

7. The method according to claim 6, wherein adjusting the generation condition of the learned model is to change the equal image size to another equal image size of different image size.

8. The method according to claim 6, wherein generating the learned model further includes:
setting a plurality of types of image sizes different from one another as the predetermined image size;
calculating the correct answer rate for each type of the image size by using a pair of the teacher image and the test image of each of the plurality of types of image sizes; and
generating the learned model by using the teacher image and the test image that have the image size having a highest calculated correct answer rate, the highest calculated correct answer rate being the correct answer rate of the predetermined image size.

9. The method according to claim 1, wherein the learned model includes:
an input layer configured to be input, as a determination image, a defect map indicating a distribution of a defect portion of a surface of steel and having the predetermined image size,
an output layer configured to output a value concerning presence/absence of periodic defects for the determination image,
an intermediate layer for which parameters have been learned by using a teacher image, the teacher image for which:
an input is a defect map having the predetermined image size as an image size of the determination image; and
an output is a value concerning the presence/absence of periodic defects for the defect map,
the learned model causes a computer to function to:
perform calculation on the determination image of the predetermined image size input into the input layer based on the parameters, and
output the value concerning the presence/absence of periodic defects from the output layer.

10. A method comprising:
acquiring imaged data for which a surface of steel has been captured;
creating a defect map that is an image indicating a distribution of a defect portion based on the imaged data;
creating a determination image for each defect map by converting an image size of the defect map into a predetermined image size; and
inputting the determination image into a learned model, outputting a value concerning presence/absence of periodic defects, and determining a pass/fail of the steel based on the value concerning the presence/absence of periodic defects, wherein
the learned model is trained using
a teacher image as an input, the teacher image (i) having the predetermined image size and (ii) being a defect map indicating a distribution of defect portions on the surface of the steel, and
a value concerning presence or absence of periodic defects in the teacher image as an output, and
the predetermined image size has a correct answer rate associated with the learned model that falls within an allowable range.

11. A steel manufacturing method comprising:
determining a pass/fail of the steel using the method according to claim 10; and
manufacturing steel by controlling a manufacturing condition based on the determination result.

12. The method according to claim 10, further comprising:
calculating a defect mixing rate of the determination image based on the defect portion; and
determining a grade of the steel corresponding to the determination image, based on the calculated defect mixing rate and a determination result of pass/fail for the steel.

13. The method according to claim 12, further including a steel manufacturing sorting step of sorting steel for each grade.

14. A non-transitory computer readable medium storing a program that, when executed, causes a computer to perform processing including:
acquiring imaged data for which a surface of steel has been captured;
creating a defect map that is an image indicating a distribution of a defect portion based on the imaged data;
creating a determination image for each defect map by converting an image size of the defect map into a predetermined image size; and
inputting the determination image into a learned model, outputting a value concerning presence/absence of periodic defects, and determining the presence/absence of periodic defects for the determination image based on the value concerning the presence/absence of periodic defects, wherein
the learned model is trained using
a teacher image as an input, the teacher image (i) having the predetermined image size and (ii) being a defect map indicating a distribution of defect portions on the surface of the steel, and
a value concerning presence or absence of periodic defects in the teacher image as an output, and
the predetermined image size has a correct answer rate associated with the learned model that falls within an allowable range.

15. A non-transitory computer readable medium storing a program that, when executed, causes a computer to perform processing including:
acquiring imaged data for which a surface of steel has been captured;
creating a defect map that is an image indicating a distribution of a defect portion based on the imaged data;
creating a determination image for each defect map by converting an image size of the defect map into a predetermined image size; and
inputting the determination image into a learned model, outputting a value concerning presence/absence of periodic defects, and determining a pass/fail of the steel based on the value concerning the presence/absence of periodic defects, wherein
the learned model is trained using
a teacher image as an input, the teacher image (i) having the predetermined image size and (ii) being a defect map indicating a distribution of defect portions on the surface of the steel, and
a value concerning presence or absence of periodic defects in the teacher image as an output, and
the predetermined image size has a correct answer rate associated with the learned model that falls within an allowable range.

16. A determination system comprising:
a defect map creation unit configured to create a defect map that is an image indicating a distribution of a defect portion based on imaged data for which a surface of steel has been captured;
a size conversion unit configured to convert an image size of the defect map into a predetermined image size to create a determination image for each defect map;
a periodic-defect determination unit configured to input the determination image into a machine-learned learned model and output a value concerning presence/ absence of periodic defects; and
a determination unit configured to determine the presence/ absence of periodic defects for the determination image and/or determine a pass/fail of the steel, based on the value concerning the presence/absence of periodic defects, wherein the learned model has been subjected to machine learning by using a teacher image of the predetermined image size as an image size of the determination image such that the value concerning the presence/absence of periodic defects is output when the determination image is input, the learned model is trained using
- a teacher image as an input, the teacher image (i) having the predetermined image size and (ii) being a defect map indicating a distribution of defect portions on the surface of the steel, and
- a value concerning presence or absence of periodic defects in the teacher image as an output, and the predetermined image size has a correct answer rate associated with the learned model that falls within an allowable range.

17. Steel manufacturing equipment comprising the determination system according to claim 16.

* * * * *